(12) United States Patent
Nagamatsu et al.

(10) Patent No.: US 8,706,171 B2
(45) Date of Patent: Apr. 22, 2014

(54) HANDS-FREE TERMINALS AND HANDS-FREE SYSTEM FOR CARS

(75) Inventors: Kenji Nagamatsu, Fuchu (JP); Naoki Watanabe, Saitama (JP)

(73) Assignee: Clarion Co., Ltd., Saitama (JP)

( * ) Notice: Subject to any disclaimer, the term of this patent is extended or adjusted under 35 U.S.C. 154(b) by 131 days.

(21) Appl. No.: 13/371,878

(22) Filed: Feb. 13, 2012

(65) Prior Publication Data

US 2012/0252370 A1    Oct. 4, 2012

(30) Foreign Application Priority Data

Mar. 30, 2011    (JP) .................................. 2011-076874

(51) Int. Cl.
*H04M 1/00*   (2006.01)
*H04M 1/60*   (2006.01)

(52) U.S. Cl.
CPC .......... *H04M 1/6075* (2013.01); *H04M 1/6033* (2013.01); *H04M 1/6041* (2013.01); *H04M 1/605* (2013.01); *H04M 1/6083* (2013.01); *H04M 1/6091* (2013.01)
USPC ................... 455/569.1; 455/556.1; 455/569.2

(58) Field of Classification Search
CPC ............ H04M 1/6075; H04M 1/6033; H04M 1/6041; H04M 1/605; H04M 1/6083; H04M 1/0091
USPC .......................... 455/566, 556.1, 569.1, 569.2
See application file for complete search history.

(56) References Cited

U.S. PATENT DOCUMENTS

2007/0129022 A1*   6/2007   Boillot et al. ................ 455/90.1
2012/0059579 A1*   3/2012   Pierfelice et al. ............. 701/427

FOREIGN PATENT DOCUMENTS

| JP | 2007-329630 A | 12/2007 |
| JP | 2008-211361 A | 9/2008 |
| JP | 2008-211670 A | 9/2008 |
| JP | 2011-205389 A | 10/2011 |

OTHER PUBLICATIONS

ITU-T Recommendation P.862: "Perceptual evaluation of speech quality (PESQ): An objective method for end-to-end speech quality assessment of narrow-band telephone networks and speech codecs", International Telecommunication Union, Feb. 2001, 3 pages.
ITU-T Recommendation P.861: "Objective quality measurement of telephone-band (300-3400 Hz) speech codecs", International Telecommunication Union, Feb. 1998, 3 pages.

(Continued)

*Primary Examiner* — Tuan Pham
(74) *Attorney, Agent, or Firm* — Mattingly & Malur, PC

(57) ABSTRACT

A user of a hands-free phone cannot determine with which speech quality the distant side of communication is listened to, and does not know which action to be required to improve the speech quality. In the case of the present invention, a function of presenting an action to be implemented by the user to improve the speech quality at the opposite party is mounted on the hands-free terminal. For the presentation here, it is assumed that the hands-free terminal according to the present invention has a function of estimating the speech quality at the distant side, a function of estimating an action to be implemented by the user to improve the estimated speech quality, and a function of presenting the estimated action to the user.

13 Claims, 16 Drawing Sheets

(56) References Cited

OTHER PUBLICATIONS

ETSI EG 202 396-3 V1.2.1, "Speech Processing, Transmission and Quality Aspects (STQ); Speech Quality performance in the presence of background noise; Part 3: Background noise transmission—Objective test methods", ETSI, Nov. 2008, 3 pages.

"VDA Specification for Car Hands-free Terminals", Version 1.5, Aug. 2004, 3 pages.

C. M. Bishop, "Pattern Recognition and Machine Learning", Springer + Business Media, LLC, New York, NY; ISBN-10: 0-387-31073-8; ISBN-13: 978-0387-31073-2; 2006; 6 pages.

* cited by examiner

| ID | Characteristics vector | Recommended action ID | Value of action |
|---|---|---|---|
| 1 | (3.1, -1.2, ···) | 7 | 1.0dB |
| 2 | (2.8, 0.3, ···) | 3 | - |
| 3 | (4.2, 1.5, ···) | 1 | 10km/h |
| ... | | | |

Recommended action ID
  1... Reduce speed
  3... Close window
  7... Speak louder

FIG. 9

| Recommended action ID | Presentation method ID |
|---|---|
| 1 | 3 |
| 2 | 2 |
| 3 | 4 |
| ... | |
| 7 | 1 |
| ... | |

Recommended action ID
   1... Reduce speed
   3... Close driver side window
   7... Speak louder Presentation method ID
   1... Display icon on display
   2... Play speech message
   3... Direct point of object device
   4... Direct control of object device

FIG. 10

| Recommended action ID | Presentation method ID | Presentation content |
|---|---|---|
| 1 | 1 | Icon 1 |
| 1 | 2 | "Reduce speed by X km/h" |
| 1 | 3 | Pointing 1 |
| 1 | 4 | Control 1 |
| 2 | 1 | .... |
| ... | | |
| 3 | 1 | Icon 5 |
| 3 | 2 | "Close driver side window" |
| ... | | |

FIG. 11

| Pointing ID | Object ID for pointing | Pointing action ID |
|---|---|---|
| 1 | Window (Right front) | Blinking of light |
| ... | | |
| 4 | Speedometer | Display "Recommended speed X km/h" |
| 5 | Car stereo | Playing of alarm 1 |
| ... | | |

FIG. 12

| Control ID | Object ID for controls | Control action ID |
|---|---|---|
| 1 | Window (Right front) | Raising of automatic window |
| ... | | |
| 5 | Car stereo | Mute |
| ... | | |

| Recommended action ID | Action object ID | Action ID |
|---|---|---|
| 1 | 3 | 5 |
| 2 | 2 | 1 |
| 3 | 4 | 3 |
| ... | | |
| 7 | 1 | 7 |
| ... | | |

Recommended action ID
1... Reduce speed
3... Close driver side window
7... Speak louder Action object ID
1... Microphone input speech
3... Speedometer
4... Window (Driver side)

Action ID
3... Raise window
5... Reduce speed
7... Increase speech power

HANDS-FREE TERMINALS AND HANDS-FREE SYSTEM FOR CARS

CLAIM OF PRIORITY

The present application claims priority from Japanese patent application JP 2011-076874 filed on Mar. 30, 2011, the content of which is hereby incorporated by reference into this application.

BACKGROUND OF THE INVENTION

1. Field of the Invention

The present invention relates to a user interface in a hands-free terminal. For instance, the present invention relates to a hands-free terminal used in a state mounted on a car or another vehicle.

2. Background Art

Presently, for the sake of communication during driving a car, a hands-free phone allowing a driver to communicate without holding a handset (cell phone) has been developed and come onto the market. In a typical hands-free phone, a microphone is disposed at a position apart from the mouth of a user in communication (driver). Accordingly, the hands-free phone internally executes a signal processing for eliminating noise input into a microphone together with a communication speech (sound unnecessary for a communication speech, such as noise during driving).

However, the signal processing also affects the communication speech. More specifically, the signal processing causes a side effect, such as deterioration in quality of communication speech. Thus, in a development stage, the contents of signal processings capable of reducing noise as much as possible while reducing the side effect as much as possible are typically discussed, and products to which only setting contents determined as optimum are applied are shipped.

However, in actuality, the optimal setting content is largely different according to the loudness and type of the voice of the user in communication, the type and loudness of noise and the like. Thus, a technique to which a plurality of setting values are preliminarily installed in the hands-free phone to allow optimal setting values to be selected for respective occasions have conventionally been proposed.

For instance, a hands-free phone at which a user in communication himself/herself can select a setting value to be applied in response to the occasion has been proposed. Further, for instance, a hands-free phone having a function of automatically selecting a setting value to be applied by the device in response to loudness of speech and noise at the occasion.

However, it can be considered that most of situations are a case where the voice of a user in communication is low, a case where a window of the car is open, the air conditioning function is in use and the like. In these situations, it can be considered that, without changing the setting of the signal processing, it is effective, in increasing communication quality, that the user in communication speaks more loudly, closes the window, or stops the air conditioner. Thus, a mechanism of feeding the current communication quality back to the user has been discussed.

JP Patent Publication (Kokai) No. 2008-211670 A (2008) discloses a mechanism that notifies a user of the transmission quality of the currently used line in an IP (Internet Protocol) phone. This document provides a mechanism of allowing the user to easily grasp communication situations by presenting the user with an objective indicator for evaluating the line quality.

JP Patent Publication (Kokai) No. 2008-211361 A (2008) discloses a technique that presents the user with communication situations, considering a cell phone as a target.

JP Patent Publication (Kokai) No. 2007-329630 A (2007) has the same object as JP Patent Publication (Kokai) No. 2008-211670 A (2008), but discloses a technique that presents a user with an amount of echo of a communication speech. JP Patent Publication (Kokai) No. 2007-329630 A (2007) is capable of presenting a user with an actual quality of a communication speech, which is different from JP Patent Publication (Kokai) No. 2008-211670 A (2008).

The current communication quality (line quality, and speech quality) can certainly be presented to a user using techniques disclosed in JP Patent Publication (Kokai) Nos. 2008-211670 A (2008), 2008-211361 A (2008) and 2007-329630 A (2007). However, even with use of these techniques, actions to be taken by the user to increase the communication quality cannot be realized. In the first place, it is difficult to change the communication quality by users' measures in typical fixed-line phones (IP phones) and cell phones assumed in JP Patent Publication (Kokai) Nos. 2008-211670 A (2008), 2008-211361 A (2008) and 2007-329630 A (2007).

In contrast, in a case where effects of communication environment on communication quality are large as in a hands-free phone used in a car, the quality of communication speech can relatively easily be improved by the user performing actions such as speaking loudly and closing the window.

SUMMARY OF THE INVENTION

The present invention has been made in consideration of the above technical problems. It is an object of the present invention to present a user with actions to be taken by the user for improving quality of a playing speech on a distant side of communication.

The present invention proposes a hands-free terminal transmitting and receiving speech data to and from at least one distant device via a communication device, including: (1) a distant speech quality estimation unit that estimates a quality of playing speech of the at least one distant device; (2) a recommended action estimation unit that estimates an action to be implemented by a user of the hands-free terminal in order to improve a quality of the playing speech; and (3) a recommended action presentation unit that presents the user with the estimated recommended action.

The present invention allows a user of a hands-free terminal to grasp which action should be taken to improve quality of a speech listened to on the distant side of communication.

Problems, configurations and advantageous effects other than those described above will be apparent by description of following embodiments.

BRIEF DESCRIPTION OF THE DRAWINGS

FIG. 9 is a diagram showing an example of stored data of a storage device of presentation method according to the embodiment.

FIG. 10 is a diagram showing an example of stored data in a storage device of presentation data.

FIG. 11 is a diagram showing an example of stored data in a storage device of pointing data.

FIG. 12 is a diagram showing an example of stored data of a control data storage device.

DETAILED DESCRIPTION OF THE PREFERRED EMBODIMENTS

Embodiments of the present invention will hereinafter be described on the basis of drawings. Note that the embodiments of the present invention are not limited to after-mentioned exemplary embodiments. Instead, various modifications are applicable thereto within the scope of the technological thought.

Embodiment 1

Overall Configuration

Figure 1:
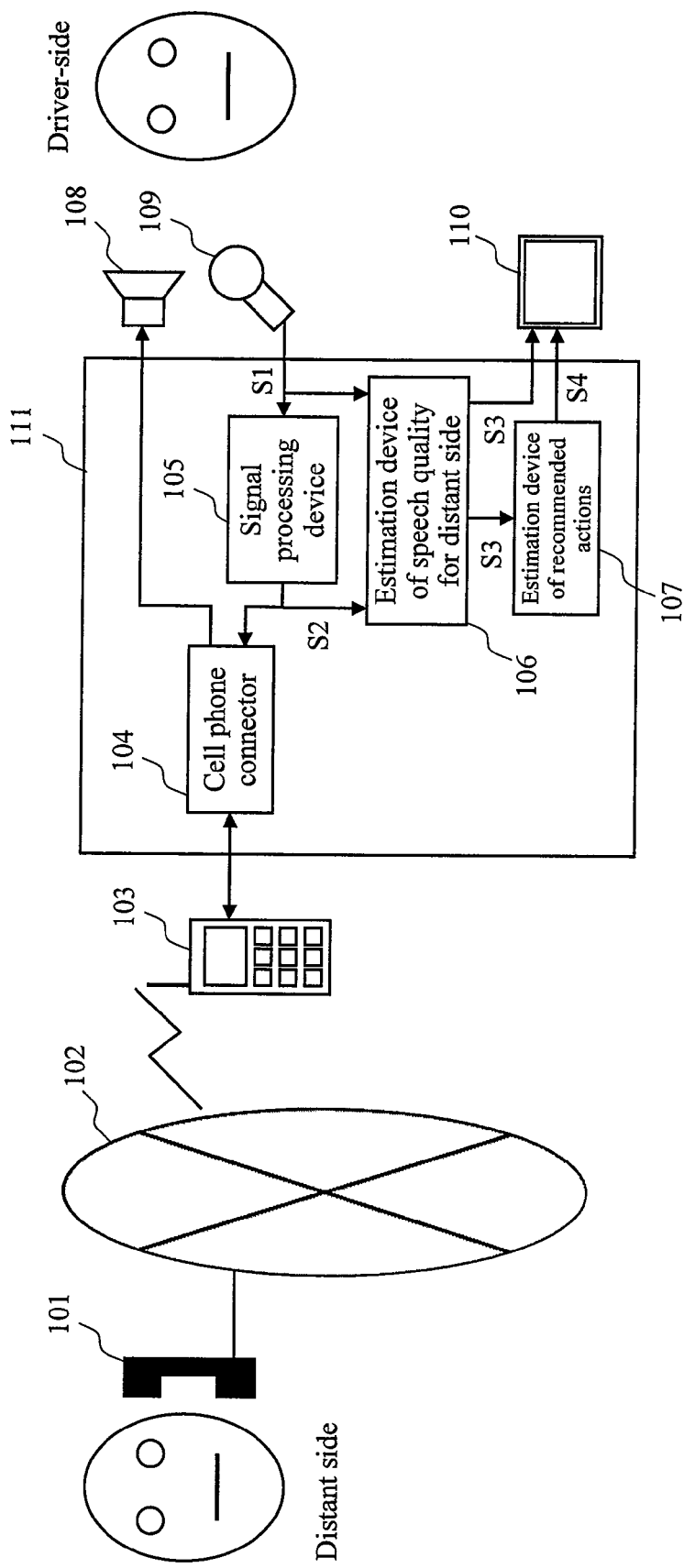
FIG. 1 is a diagram illustrating an overall configuration of a hands-free system according to Embodiment 1.

FIG. 1 shows an overall configuration of a hands-free system of this embodiment. This system assumes communication realized between a driver of a car and the opposite party.

Devices configuring the hands-free system are a phone 101, a public telephone network 102, a cell phone 103, and a hands-free phone 111.

In this embodiment, the phone 101 may be a fixed-line phone or a cell phone.

The public telephone network 102 is a typical phone line network connected with a fixed-line phone and a cell phone. This network may be an IP network. The driver and the opposite party on the distant side in this embodiment communicate with each other via the public telephone network 102.

The cell phone 103 is a communication device connected with the hands-free phone 111. The hands-free phone 111 is a device having a recommended action presenting function according to the present invention. In a case of this embodiment, the hands-free phone 111 is mounted on a car. Note that the hands-free phone 111 does not have a communication function. Accordingly, it is required for communication to connect the cell phone 103 and the hands-free phone 111 to each other.

The hands-free phone 111 includes a cell phone connector 104, a signal processing device 105, an estimation device of speech quality for the distant side 106, and an estimation device of recommended actions 107.

The cell phone connector 104 is an interface device for connecting the hands-free phone 111 to the cell phone 103. Connection modes to the cell phone 103 include a wired scheme using a connection cable or the like and a wireless scheme using the Bluetooth or the like. The cell phone connector 104 is embedded with a speech player, and decodes speech data received from the phone 101 on the distant side and outputs the data to a loudspeaker 108. The cell phone connector 104 outputs the speech data input through the signal processing device 105, to the cell phone 103.

The signal processing device 105 is connected to the microphone 109, and receives a speech from a user (driver) as an input of original speech data S1. Noise such as car driving noise is typically superimposed on the original speech data S1. The signal processing device 105 applies noise canceling or another speech signal processing to the original speech data S1 to thereby emphasize only a speech part. That is, the signal processing device 105 executes a process of restraining a noise component of the original speech data S1. The signal processing device 105 outputs processed speech data S2 to the cell phone connector 104 and the estimation device of speech quality for the distant side 106.

The estimation device of speech quality for the distant side 106 receives the original speech data S1 and the processed speech data S2 as inputs, and estimates quality of a speech played on the phone 101 on the distant side of communication. In this specification, the speech played on the phone 101 on the distant side of communication, that is, the speech listened to by the opposite party, is also referred to as "speech on the distant side". The specific content of the estimating process will be described later. Note that the estimation device of speech quality for the distant side 106 may receive only the processed speech data S2 as an input, and estimate the quality of the speech played on the phone 101 of the distant side of communication.

The estimation device of recommended actions 107 receives an estimated result (estimated speech quality S3) of the estimation device of speech quality for the distant side 106, and estimates an action to be performed by the user (driver) in order to improve the quality of the speech on the distant side. The specific content of the estimating process will be described later.

The loudspeaker 108 is an output device outputting speech data transmitted from the phone 101 of the opposite party and received by the cell phone 103 and separated by the cell phone connector 104.

The microphone 109 is an input device that converts the speech of the user into digital speech data and supplies the data to the hands-free phone 111. In a case of the hands-free phone 111, the microphone 109 is arranged, for instance, at a position apart from the mouth of the user by about several centimeters to one meter. In this case, not only the speech of the user but also noise during driving the car, wind noise from the window, operation noise of the air conditioning device, noise of the car stereo and the like are superimposed on the speech input into the microphone 109.

A presentation device of recommended actions 110 is a device that presents the user with the distant speech quality (estimated speech quality S3) estimated by the estimation device of speech quality for the distant side 106 and the recommended action (recommended action data S4) estimated by the estimation device of recommended actions 107. Typically, the presentation is often integrated into the display screen and the like of the car navigation system in a shared manner. In this case, data pertaining to characters and images displayed on the display screen are generated by the estimation device of speech quality for the distant side 106 and the estimation device of recommended actions 107. Use of characters and images allows communication situations to be presented to the user in an understandable manner. For instance, icons illustrating recommended actions are displayed. In addition thereto, there is another method of presenting the recommended action and the like by a speech. In a case of being supported by the vehicle, the recommended actions may be presented using a sound or light through a light source or a loudspeaker installed at a device or a place which is the object for controls of the recommended action. Embodiments thereof will also be described later.

[Overview of Hands-Free Talking Process]

Figure 2:
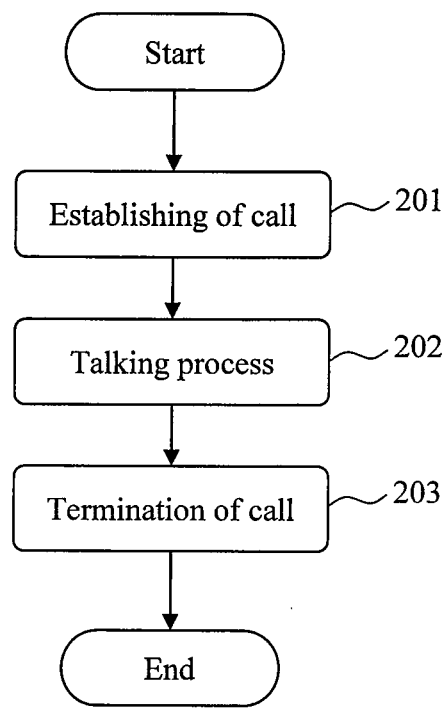
FIG. 2 is a flowchart illustrating an overall speech communication process according to an embodiment.

FIG. 2 illustrates an overview of a hands-free talking process executed through the hands-free phone 111 (FIG. 1).

When using the hands-free phone 111, the user activates a hands-free phone function according to the following operations. More specifically, establishing of call 201 is activated.

For instance, when the user selects the communication function on the screen of a display with a touch function, the establishing of call 201 is activated. For instance, in the case where the hands-free phone 111 or the car navigation device supports the sound command input function, when the user inputs a designated command via the microphone 109, the establishing of call 201 is activated.

Next, when the user selects the opposite party or the like, the establishing of call 201 executes establishing of connection to the phone 101 on the distant side. The detailed content of the process is well-known. Accordingly, detailed description thereof is omitted.

After the establishing of call 201 is completed and the connection is established to the phone 101 on the distant side, the talking process 202 is executed. In the talking process 202, two process operations are executed.

One process is a process of restraining noise in the speech of the user (driver) as with a conventional device. Here, the signal processing device 105 is used for the process of restraining noise. The signal processing device 105 executes a process that extracts only the speech of the user from the speech data input in which noise is mixed and transmits the extracted speech to the phone 101 on the distant side. The details of the process are analogous to those of the conventional hands-free phone. Accordingly, detailed description thereof is omitted.

The other process is a process that the inventors present in this embodiment. More specifically, the process includes a process of estimating the quality of the speech on the distant side, a process of estimating an action recommended for improving the estimated quality, and a process of presenting the user with the recommended action. The details of these processes will be described in another paragraph.

Lastly, when the user completes the communication, the talking process 202 is finished and termination of call 203 is executed. The content of the termination of call 203 is analogous to that of the existing hands-free phone. Accordingly, the detailed description thereof is omitted.

The hands-free phone 111, as a whole, executes the aforementioned processes.

[Overview of Talking Process 202]

Figure 3:
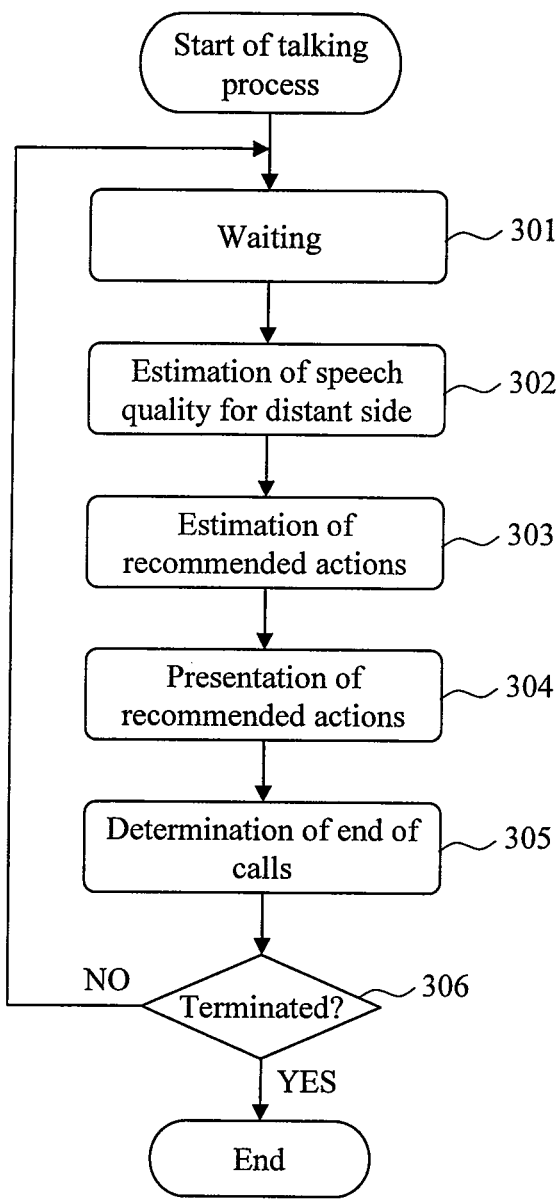
FIG. 3 is a flowchart illustrating the content of a talking process according to the embodiment.

FIG. 3 shows the contents of the processes executed by the hands-free phone 111 in relation to estimation of the recommended action. These processes are related to the estimation device of speech quality for the distant side 106, the estimation device of recommended actions 107 and the presentation device of recommended actions 110.

After the talking process 202 is activated, waiting 301 is executed first. The waiting 301 is a process that stops execution of the process for a prescribed time. The waiting 301 is a waiting time for estimating the quality of a speech on the distant side, estimating a recommended action based on the estimated result, and executing presentation of the recommended action at a constant time interval.

The waiting time may always be a certain time. Instead, in a case of storing the estimated result of the distant speech quality and the characteristics of the speech data input into the microphone 109 (frequency band power etc.) for a certain time period, the waiting time may be, for instance, is a time until the estimated result and the characteristics are changed.

After the waiting time has elapsed, estimation of speech quality for distant side 302 is executed. The process is executed by the estimation device of speech quality for the distant side 106. Here, the estimation device of speech quality for the distant side 106 receives the original speech data S1 and the processed speech data S2 input into and output from the signal processing device 105. Here, the original speech data S1 corresponds to the speech input into the microphone 109. The processed speech data S2 corresponds to the speech data after subjected to the signal processing by the signal processing device 105.

In the case of this embodiment, the estimation device of speech quality for the distant side 106 analyzes a difference between the two pieces of input data, and estimates the quality of the speech on the distant side. The details of the process will be described later.

Next, estimation of recommended actions 303 is executed. This process is executed by the estimation device of recommended actions 107. Here, the estimation device of recommended actions 107 estimates an action to be taken by the user (driver) for improving the speech quality on the basis of the quality information estimated by the process 302. The details of the process will also be described later.

Subsequently, presentation of recommended actions 304 is executed. The process is executed by the presentation device of recommended actions 110. Here, the presentation device of recommended actions 110 presents the user with the recommended action estimated by the process 303 in an understandable manner. The details of the process will also be described later.

Subsequently, determination of end of calls 305 is executed. The determination of end of calls 305 determines whether or not termination of the current hands-free speech communication is pointed by the user. If it is determined to be termination of the communication (in a case of an affirmative result in the process 306), the talking process 202 is terminated. If it is not determined to be termination of the communication (in a case of a negative result in the process 306), the processing returns to the waiting 301. Accordingly, the processes of speech quality estimation, recommended action estimation, and recommended action presentation are repeated after a certain waiting time has elapsed.

[Details of Estimation of Speech Quality for Distant Side]

The content of estimation of speech quality for distant side 302 executed by the estimation device of speech quality for the distant side 106 will hereinafter be described below in detail.

Some currently existing methods can be used for the device and execution of the process.

For instance methods can be used that are disclosed in ITU-T Recommendation P.862: "Perceptual evaluation of speech quality (PESQ): An objective method for end-to-end speech quality assessment of narrow-band telephone networks and speech codecs", and ITU-T Recommendation P.861: "Objective quality measurement of telephoneband (300-3400 Hz) speech codecs", and ETSI EG 202 396-3 V1.2.1: "Speech Processing, Transmission and Quality Aspects (STQ); Speech Quality performance in the presence of background noise, Part 3: Background noise transmission—Objective test methods," 2009-01.

Among them, "Perceptual evaluation of speech quality (PESQ): An objective method for end-to-end speech quality assessment of narrow-band telephone networks and speech codecs" and "Objective quality measurement of telephoneband (300-3400 Hz) speech codecs" disclose techniques that compare a target speech for estimation of the speech quality (the speech on the distant side in this embodiment) and the original speech with each other and perform computation to thereby predict a subjective evaluation prediction on the phone speech quality. However, these methods are techniques, such as for an IP phone, where noise is not superimposed on the original speech, that is, a case of assuming use of a clear speech.

Accordingly, it can be considered that, in a case of application to this embodiment where various types of noise, such as drive noise, are superimposed on the original speech, estimation accuracy is degraded in general. However, the quality of the speech on the distant side can be estimated to a certain extent.

"Speech Processing, Transmission and Quality Aspects (STQ); Speech Quality performance in the presence of background noise, Part 3: Background noise transmission—Objective test methods" discloses a technique that outputs a subjective evaluation prediction using a speech input into the phone on the talking side (speech input into the microphone 109 in this embodiment) in addition to the original speech and the speech on the distant side. Here, the subjective prediction is a value obtained by converting the evaluation of the opposite party into a numerical value. Also as to this method, in a case of application to this embodiment where various types of noise, such as drive noise, are superimposed on the original speech, it is considered that the estimation accuracy is degraded in general. However, the quality of the speech on the distant side can be estimated to a certain extent.

As described above, in the case of this embodiment where noise is superimposed on the input speech, it is expected that the estimation accuracy is generally degraded in every method. However, the quality of the speech on the distant side can be estimated to a certain extent. The estimated quality is sufficient to estimate the recommended action in this embodiment.

VDA Specification for Car Hands-free Terminals discloses a speech quality estimation technique assuming an application to hands-free phone mounted on a car. This estimation technique is a speech quality estimation indicator for a hands-free phone for a car specified by the German Association of the Automotive Industry (VDA). A technique realizing this has already come onto the market. The estimation device of speech quality for the distant side 106 can be realized by implementing this technique.

The applicant of this application has assumed hands-free communication on a car navigation device and filed a technique of estimating speech quality of a speech input from a microphone on which noise such as driving noise is superimposed (Japanese Patent Application No. 2010-080886). This method compares speech data immediately before a signal processing, such as noise elimination, (at a microphone end) with speech data as a target of the speech quality estimation (from an idealistic viewpoint, data at the distant communication side; in actuality, speech data after the signal processing), and calculates an estimation.

Figure 14:
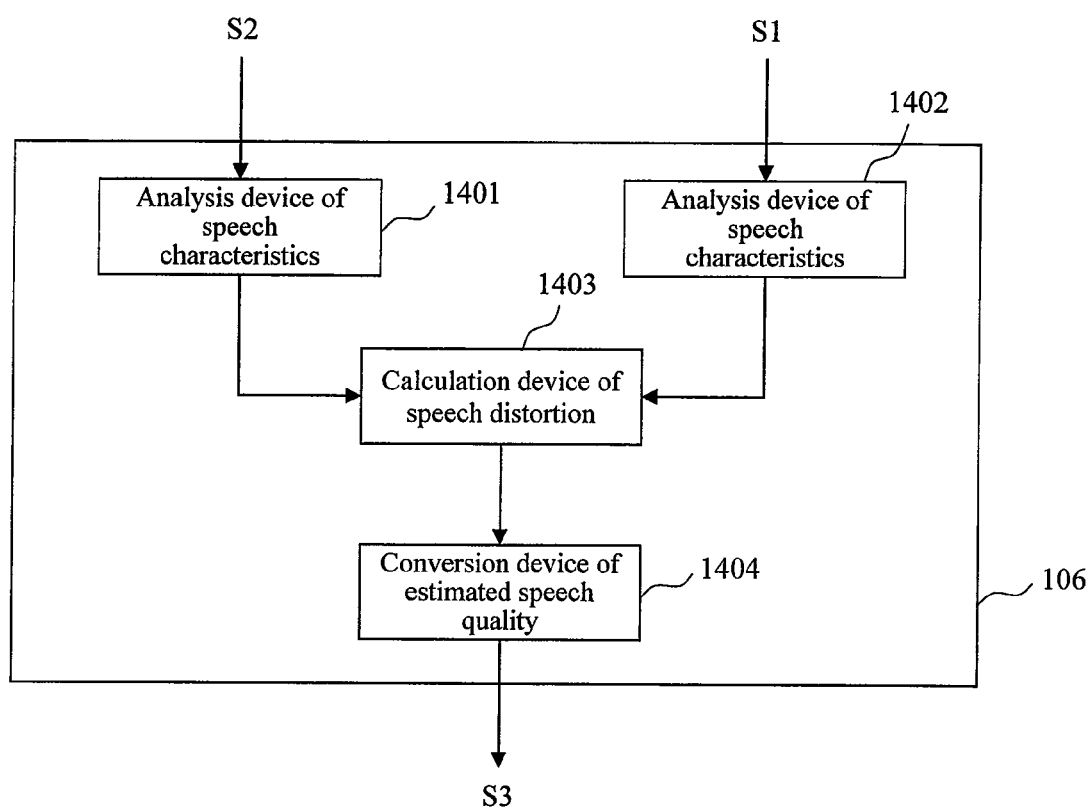
FIG. 14 is a diagram illustrating an embodiment of an estimation device of speech quality for the distant side.

FIG. 14 shows an example of an internal configuration of the estimation device of speech quality for the distant side 106 to which this method is applied. The estimation device of speech quality for the distant side 106 receives two pieces of speech data as inputs, as with the case of application of the aforementioned non patent documents. One of the two pieces of speech data is the original speech data S1 (speech data on the microphone end side). The other is the processed speech data S2. In this embodiment, the speech distortion is calculated from the difference between the two pieces of speech data, a certain conversion process is applied to the distortion to thereby calculate the estimated speech quality S3 of the processed speech.

First, analysis devices of speech characteristics 1401 and 1402 calculate physical quantity representing characteristics of speech data as an input target (i.e. speech characteristics). For instance, speech powers of respective divided bands obtained by dividing a frequency band can be used as the speech characteristics here. The speech power is a physical quantity that can directly be obtained from a speech. An indicator referred to as loudness obtained by applying a conversion process in consideration of human auditory characteristics to characteristics having been subjected to frequency analysis can be used as the speech characteristics here. It is a matter of course that characteristics other than these can be used. As the speech characteristics to be calculated here, only any of the aforementioned indicators may be used, or a vector quantity combining these indicators may be used.

Both the obtained speech characteristics of the original speech data S1 and processed speech data S2 are supplied to a calculation device of speech distortion 1403. The calculation device of speech distortion 1403 calculates one indicator referred to as a speech distortion, on the basis of the two sets of speech characteristics.

As a method of calculating a distortion, various methods can be considered that include a method of simply obtaining a difference of scalar (single values) speech characteristics, a method of obtaining a distance (Euclidean distance etc.) between vector speech characteristics, a method of obtaining an inner product of vectors, and a method of weighting these. The aforementioned known methods calculate a similar difference (distance).

The calculated distortion is supplied to a conversion device of estimated speech quality 1404. The conversion device of estimated speech quality 1404 converts the obtained speech distortion into the estimated speech quality S3 and outputs the converted quality. The aforementioned speech distortion is basically a value defined on a linear scale in which human auditory characteristics are reflected. Accordingly, the conversion process in the conversion device of estimated speech quality 1404 may be a linear conversion.

However, in a case of using the estimated speech quality S3 more conforming to applied scenes, a nonlinear conversion process may be adopted. For instance, in the case where the content of a speech cannot be recognized if the distortion becomes a certain extent or more, as with a hands-free communication, a nonlinear conversion process that significantly reduces the estimated speech quality S3 associated with the distortion at or exceeding a certain extent may be adopted.

Thus, the estimation device of speech quality for the distant side 106 estimates the quality of the speech on the distant side on the basis of the speech characteristics (physical quantity)

of the two pieces of speech data corresponding those before and after the signal processing executed by the signal processing device 105. The estimation device of speech quality for the distant side 106 may estimate only from the processed speech data S2. Thus, output information of the estimation device of speech quality for the distant side 106 is quality information on the speech on the distant side. However, in the most simple embodiment, one value, which is a subjective speech quality estimation calculated by the aforementioned known technology, may be adopted as the output information of the estimation device of speech quality for the distant side 106.

More preferably, the estimation device of speech quality for the distant side 106 may output some useful characteristics among the various speech characteristics used when calculating the estimated speech quality S3, together with the estimated speech quality S3. As the speech characteristics, for instance, the power (dB) of the voice of a speaker, the powers of the voice of speaker in respective frequency bands, the power of noise restrained by the noise canceling process, the powers of respective frequency bands or the like may be used. As detailed analysis result of the voice of the speaker, for instance, pieces of information related to a manner of speech by the speaker (articulation), such as a ratio of average powers of the vocal section and the mute section, are also useful.

[Details of Estimation of Recommended Actions]

An example of an internal configuration of the estimation device of recommended actions 107 and the content of the estimation of recommended actions 303 will hereinafter be described in detail. The following description uses FIGS. 4 and 5.

Figure 4:
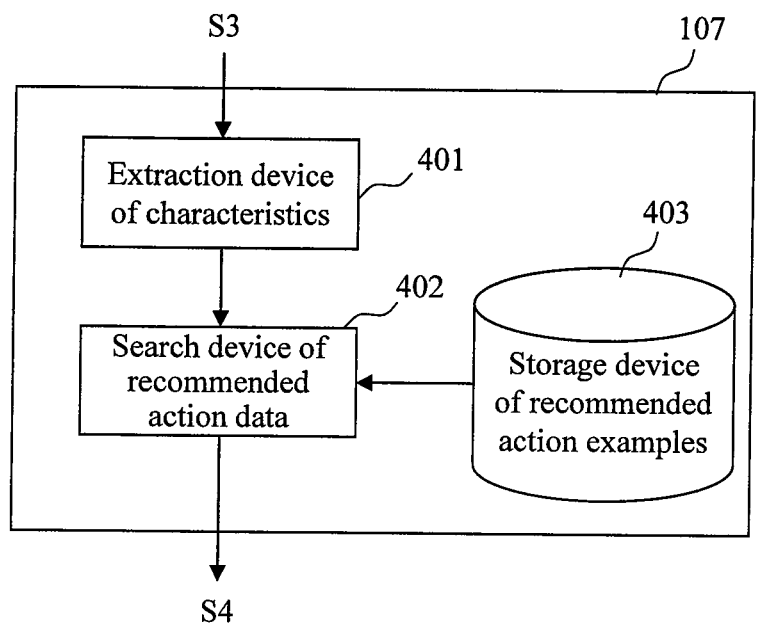
FIG. 4 is a diagram showing a configuration of an estimation device of recommended actions according to the embodiment.

FIG. 4 shows the example of the internal configuration of the estimation device of recommended actions 107. The estimation device of recommended actions 107 includes an extraction device of characteristics 401, a search device of recommend action data 402 and a storage device of recommended action examples 403.

The extraction device of characteristics 401 extracts characteristic data (vector) usable for searching for recommended action example data from the estimated speech quality S3 (including a conversion process).

The extracted characteristic data (vector) is supplied to the search device of recommend action data 402. The search device of recommend action data 402 searches a large quantity of recommended action example data accumulated in the storage device of recommended action examples 403, for recommended action example data most similar to the previously extracted characteristic data (vector). The details of the process will be described later.

The storage device of recommended action examples 403 is a storing device that stores a large quantity of characteristic data (vector) and recommended action data, which individually describes one or more recommended action associated with the characteristic data (vector). A data storing device, such as a hard disk device or a flash memory device, is used as the storing device.

The retrieved recommended action data S4 is output from the estimation device of recommended actions 107.

Figure 5:
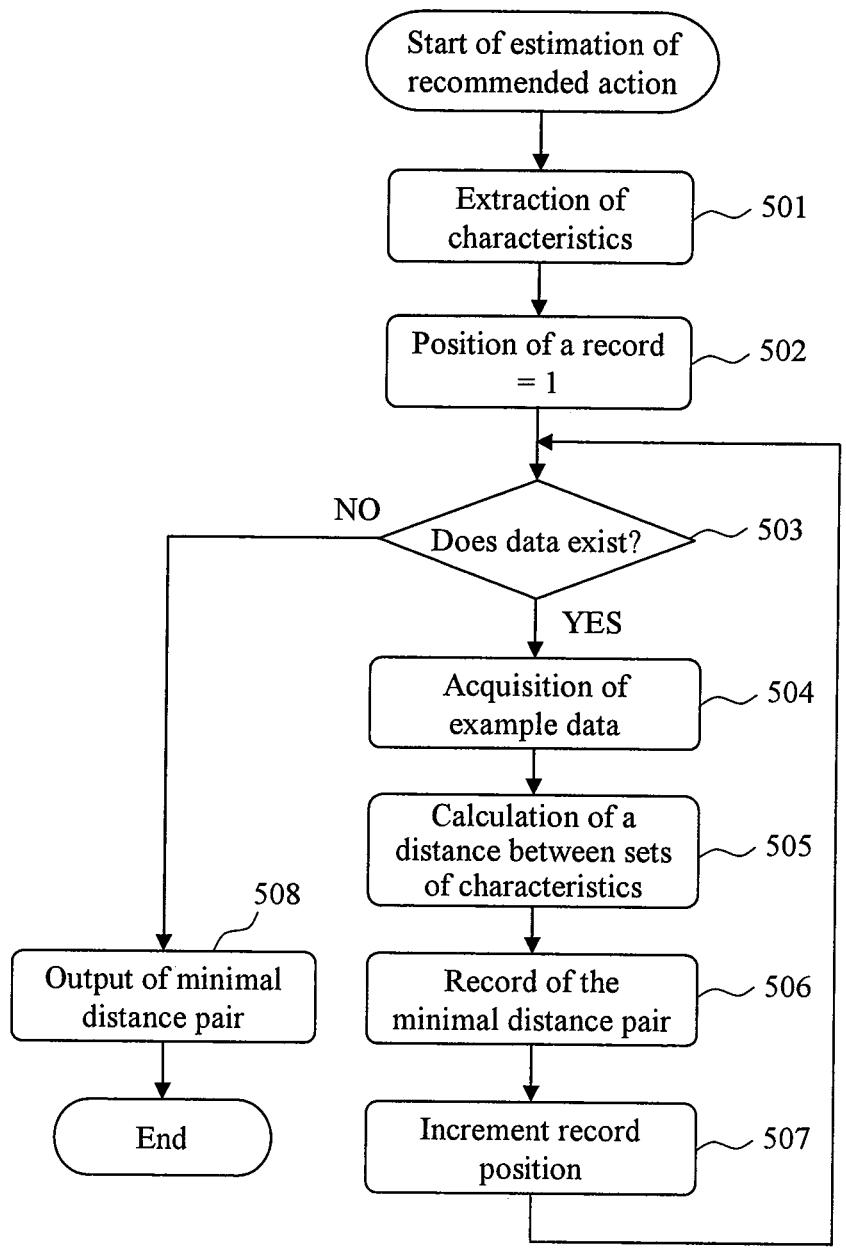
FIG. 5 is a flowchart illustrating the content of estimation of recommended actions according to the embodiment.

FIG. 5 shows an embodiment of the content of the process executed by the estimation device of recommended actions 107.

After the process in the estimation device of recommended actions 107 is started, first, extraction of characteristics 501 is executed. In the extraction of characteristics 501, a process of converting the estimated speech quality S3 into characteristic data (vector) usable for searching for recommended action example data. For instance, a process of converting the estimated speech quality S3 by a nonlinear function (logarithmic function, exponential function, etc.), a process of multiplying the estimated speech quality S3 by a weight, a process of adding an offset to the estimated speech quality S3 or the like is executed. It is preferable to execute the conversion process here such that the converted value is a value useful for calculating a characteristic distance with the example.

It is different to apply which converting function, according to the content of the input estimated speech quality S3. Accordingly, the converting function is predetermined at a development stage of the hands-free communication device such that the accuracy of the recommended action estimation becomes highest. The determined converting function can preliminarily be implemented as a processing program in the extraction of characteristics 501. More specifically, it is desirable to separately have the types of the functions and coefficients in a table format. In this case, data updating in the future can be supported by selecting the type of the function and the coefficients.

It is desirable in the input estimated speech quality S3 that, as described above, not only a single value but also the various acoustic and speech characteristics used for obtaining the value be input. The accuracy of searching for the recommended action example data, that is, an estimation accuracy of the recommended action can be improved by inputting of various values.

Further, it is preferable to supply the extraction of characteristics 501 with not only output information of the estimation device of speech quality for the distant side 106 but also vehicle information. For instance, it is preferable to supply the extraction of characteristics 501 with pieces of information, such as a piece of information of whether or not the window is open and a piece of information of whether or not the air conditioning device is in operation. The information other than on the speech of the user input into the microphone 109 is thus used, thereby allowing the estimation accuracy of the recommended action to be further improved.

There are many hands-free phones 111 integrated into car navigation devices. In this case, various pieces of situation information related to a car on which the hands-free phone 111 is mounted (close or open situation of a window, operation situations of an air conditioning device and a vehicle-mounted radio, drive situations such as a traveling speed and an engine speed and the like) can often be used directly.

Further, there is a high probability that these pieces of situation information represent situations of causing noise factors likely to be related to degradation in speech quality of hands-free communication. Accordingly, use of these pieces of situation information with the estimated speech quality S3 improves the estimation accuracy of the recommended action.

If these pieces of information other than the acoustic information (situation information of the car) are converted by a certain function, the converted information can be subjected to calculation of a distance with the recommended action example data. It is a matter of course that the type of function and coefficients to be used are required to be predetermined at the development stage.

The processes 502 to 508 correspond to the process operations in the search device of recommend action data 402. The content of the process operations corresponds to the content of the process for searching for the recommended action example data having a shortest distance to the extracted characteristic data (vector).

In a case of the following description, it is assumed that the recommended action example data is stored in the storage device of recommended action examples 403 and arranged sequentially from a storing address of "position 1".

First, in the process 502, the record position of the recommended action example data is initialized. Subsequently, the processes 503 to 507 are sequentially executed. First, a process of determining whether or not data exists in a next obtaining target position (process 503) is executed. If the data exists, (affirmative result in process 503), a process of obtaining the recommended action example data (process 504) is executed.

Next, the distance between sets of the characteristic data (vector) extracted in the extraction of characteristics 501 and the characteristic data (vector) assigned to the taken recommended action example data is calculated (process 505). Various distance calculation methods including a simple Euclidian distance are applicable to the calculation of the distance. The calculated distance is compared with the minimum of the currently recorded distances (the minimal distance). If the distance of the recommended action example data calculated this time is smaller, this newly calculated distance is stored as a new minimal distance (process 506). Subsequently, the value of the record position of the data is incremented by "1", and the processing returns to the process 503. During the affirmative result is obtained in the process 503, the aforementioned processes are repeated.

If the negative result is obtained in the process 503 (if the process of comparing the distance is completed with every piece of recommended action example data), a process 508 is executed. That is, the recommended action example data corresponding to the currently recorded minimum distance is output as the aforementioned recommended action data S4.

Figures 6, 7:
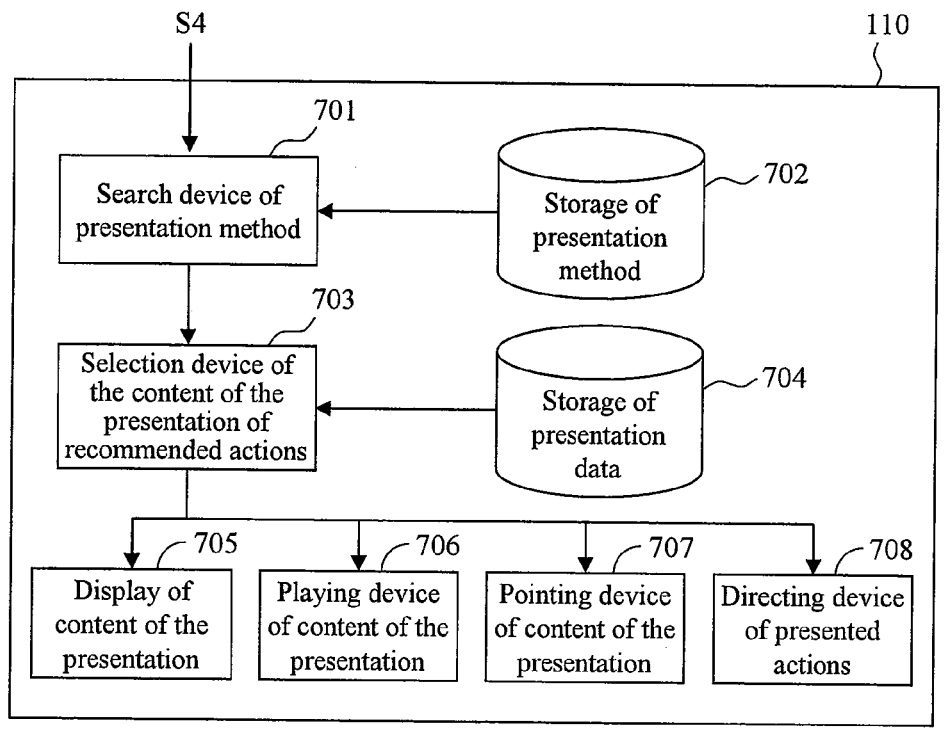
FIG. 6 is a diagram showing an embodiment of recommended action examples.
FIG. 7 is a configuration of presentation device of recommended actions according to the embodiment.

FIG. 6 shows an example of a structure of a data table accumulated in the storage device of recommended action examples 403. It is the matter of course that the data table is an example. Another data structure can be adopted. The data table shown in FIG. 6 is stored with recommended action example data including sets of a record position ID, a characteristics vector, a recommended action ID, and a recommended value of action. Here, the recommended action ID is stored as information for identifying the recommended action. However, the recommended action may be stored in a text format or another data format. In a case where the recommended action is accompanied by a quantity, a recommended value of action is also stored. However, the value is not necessarily stored. In the case of storing the value of action, not only the recommended action but also a required value of action can specifically be presented. Accordingly, in the case of using the data table shown in FIG. 6, the recommended action ID and the value of action (in the case of being provided) are output as the recommended action data S4.

What has been described above is the embodiment of the estimation device of recommended actions 107 and the process operations thereof (estimation of recommended actions 303). Note that the aforementioned embodiment uses one of machine learning algorithms, that is, the k-nearest neighbor method. In other words, the embodiment describes a method of outputting a recommended action corresponding to recommended action example data satisfying k=1 (the minimum distance).

In a case of accumulating a large quantity of recommended action example data, a method may be adopted that increases the value of k (i.e., k pieces of recommended action example data are selected from those having a finally smaller distance) and determines a recommended action from among k pieces of recommended action example data by a majority rule or the like. In this case, the estimation accuracy can be improved. The details of the improving method are disclosed in documents on machine learning (e.g. Bishop, "Pattern Recognition and Machine Learning", Springer-Verlag) and the like.

This embodiment uses the k-nearest neighbor method. However, various methods of machine learning other than that (e.g. the decision tree, and determination by SVM and regression) and the like can be used.

[Details of Presentation of Recommended Actions]

An example of an internal configuration of the presentation device of recommended actions 110 and the content of the presentation of recommended actions 304 executed in the device will hereinafter be described in detail. Following description uses FIGS. 7 and 8.

FIG. 7 shows an example of the internal configuration of the presentation device of recommended actions 110. The presentation device of recommended actions 110 includes a search device of presentation method 701, a storage of presentation method 702, a selection device of the content of the presentation of recommended actions 703, a storage of presentation data 704, a display of content of the presentation 705, a playing device of content of the presentation 706, a pointing device of content of the presentation 707, and a directing device of presented actions 708.

The aforementioned description on the overall configuration (FIG. 1) mainly assumes the case where the presentation device of recommended actions 110 is a display, such as a display of the car navigation device (the case of presentation using visual information).

However, with reference to FIG. 7, another example of a device usable as the presentation device of recommended actions 110 will also be described. For instance, the description will be made on an example of a device that realizes presentation by means of auditory information, such as a sound and a speech, and an example of a device that points or presents positions around targets of recommended actions, such as the window, the air conditioning device and the car stereo, or devices or buttons to be operated, by means of visual information or auditory information. With reference to FIG. 7, description will also be made on a mechanism of switching these three types of presentation methods.

The presentation device of recommended actions 110 is supplied with the recommended action data S4 (including an amount of recommended action) from the estimation device of recommended actions 107. At this time, the recommended action data S4 is input into the search device of presentation method 701. The search device of presentation method 701 determines which type of information the recommended action is presented to the user (driver). In this case, the search device of presentation method 701 refers to the storage of presentation method 702 and selects the presentation method.

FIG. 9 shows an example of a structure of a data table stored in the storage of presentation method 702. It is a matter of course that this data table is an example and another data structure may be adopted. The data table shown in FIG. 9 is stored with presentation method data including sets of a recommended action ID and a presentation method ID. Here, the recommended action ID is stored as information for identifying the recommended action. The information identifying a presentation method ID is stored as information for identifying the recommended action. However, the ID may be stored in the text format or another data format.

In the case of FIG. 9, four types of presentation methods are assumed, and four IDs, ID1 to ID4, are prepared. In the case of this embodiment, ID1 corresponds to the method of displaying an icon (message) on the display of car navigation device. ID2 corresponds to a method of playing a speech message from the speech playing device. ID3 corresponds to a method of directly pointing the object device. ID4 corresponds to a method where the presentation device of recommended actions 110 directly controlling the object device to thereby automatically executing the recommended action.

Here, as the method of ID3 that directly points the object device, methods can be considered that include a method of directly pointing to the user the object device through the device or the button directly corresponding to the recommended action, the device related to the recommended action, or a lamp or a loudspeaker disposed around them.

For instance, in the case where the recommended action is "REDUCE SPEED" and assigned with the presentation method denoted by ID3, the devices that directly realize speed control are the accelerator and the brake. However, a method of displaying information on a speedometer for displaying the speed is also understandable for the user. In such a case, the presentation device of recommended actions 110 displays the recommended speed in a manner overlapping on the current speed displayed by the speedometer, which relates to the recommended action.

In the case where the target of the recommended action is the window, the air conditioning device, the car stereo or the like, which is more understandable by presenting the position at which the device is actually disposed, a method can be considered that blinks the lamp disposed around the position or causes the loudspeaker around the position to play the alarm.

The selection device of the content of the presentation of recommended actions 703 determines which information is specifically displayed, presented or played according to the presentation method determined by the search device of presentation method 701. For the sake of the determination, the selection device of the content of the presentation of recommended actions 703 refers to the storage of presentation data 704. FIG. 10 shows an example of a structure of a data table stored in the storage of presentation data 704. It is a matter of course that the data table is an example and another data structure may be adopted. The data table shown in FIG. 10 stored with presentation data including sets of the recommended action ID, the presentation method ID and presentation content. The recommended action ID and the presentation method ID are identical to those in the storage of presentation method 702 shown in FIG. 6.

Here, the field of the presentation content is stored with specific presentation contents associated with the respective sets of the recommended action ID and the presentation method ID. That is, the field of the presentation content is stored with information that points which type of display data and speech data is displayed or played, and, information that points which control is executed in a case of directly pointing or controlling the object device.

For instance, in a case where the recommended action ID is ID1 (reduce speed), and the presentation method ID is ID1 (the icon is displayed on the display), the field of the presentation content in FIG. 10 is stored with "icon 1". For instance, the action ID is ID1 (reduce speed) and the presentation method ID is ID2 (the speech message is played), the field of the presentation content in FIG. 10 is stored with for instance "REDUCE SPEED BY X KM/H" is stored. Note that this storing example is an information storing method assuming a technique, as with speech synthesis, that is capable of converting a text into a speech as it is. In this case, a character "X" in the message may be processed in a manner replaced with an amount of a recommended action (in this case, the amount of speed to be reduced), thereby negating the need of recording all the variations that can be substituted for the character "X" in the speech message.

It is a matter of course that, in a case of adopting a speech presentation method that plays a recorded speech message, the presentation method ID for playing a speech may be stored in association with a prescribed speech message ID.

Further, FIG. 10 shows an example of storing data "POINTING 1" in a field of the presentation content, as an example of a case where the presentation method ID is ID3 (a case of directly pointing the object device). The "POINTING 1" is a label attached to a program or a device. Accordingly, in a case where the presentation content is a label, the corresponding program or device is activated by the pointing device of content of the presentation 707, and a pointing action to the object device is executed. In the case of FIG. 10, as to the recommended action of "REDUCE SPEED", an action that directly displaying a recommended speed on the speedometer and presents the speed to the user is executed.

Further, FIG. 10 shows an example in which data of "CONTROL 1" is stored in the field of the presentation content, as an example in a case where the presentation method ID is ID4 (the case where the presentation device of recommended actions 110 directly controls the object device). The "CONTROL 1" is also a label assigned to the program or the device. In this case, the directing device of presented actions 708 directly controls the object device on the basis of the program or the device pointed by "control 1". Specific controls on respective devices based on determined details are well-known techniques. Accordingly, detailed description thereof is omitted from this specification.

The specific presentation content (display data for an icon and the like, a message text for speech synthesis, recorded speech data, and device pointing and controlling data) selected by the selection device of the content of the presentation of recommended actions 703 is supplied to the corresponding device. For instance, display data, such as an icon, is supplied to the display of content of the presentation 705. For instance, a message text for speech synthesis or recorded speech data are supplied to the playing device of content of the presentation 706. For instance, pointing content to the device is supplied to the pointing device of content of the presentation 707. For instance, the control content to the device is supplied to the directing device of presented actions 708. Through these devices, display on the display screen of the car navigation device, playing of a speech from the loudspeaker, pointing action to the object device, and direct control are executed.

Figure 8:
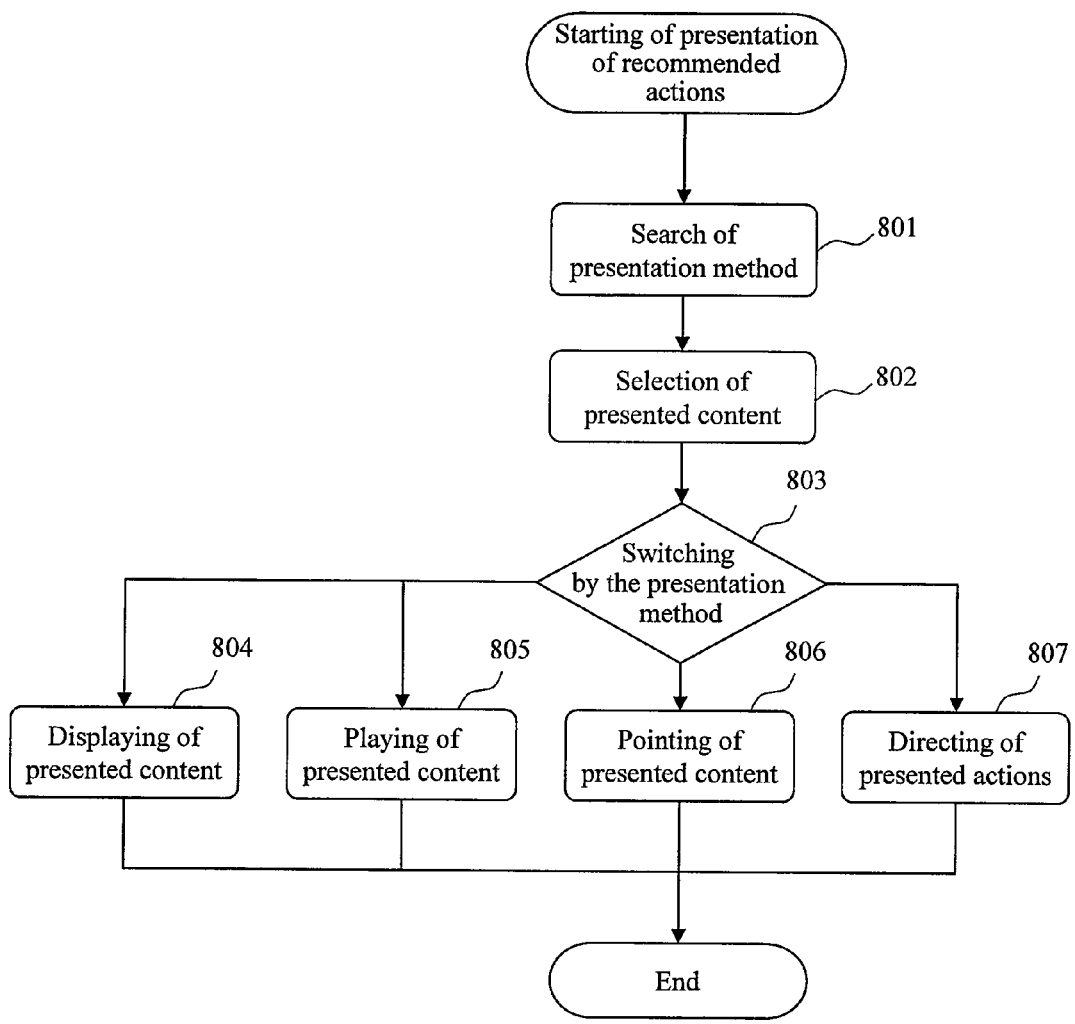
FIG. 8 is a flowchart illustrating the content of presentation of recommended actions of the embodiment.

FIG. 8 shows an embodiment of processing content executed by the presentation device of recommended actions 110. After the process of the presentation device of recommended actions 110 is activated, first, search of presentation method 801 for determining the presentation method of the recommended action is executed. In the search of presentation method 801, two pieces of data, which are the recommended action ID and the value of action, are input as the recommended action data S4.

The search of presentation method 801 searches the presentation method data (FIG. 9) stored in the storage of presentation method 702, for the presentation method matching with the input recommended action ID. In the case of FIG. 9, a unique presentation method ID is assigned to the recommended action ID. Accordingly, in the case of the searching process using the data table in FIG. 9, data matching with the recommended action ID is simply searched for.

However, the content of the recommended action data S4 is not limited to the method of simply using the recommended action ID. In other cases, a searching process corresponding to the content of the recommended action data S4 should be realized.

After the presentation method is determined, a selection of presented content 802 is executed. The selection of presented content 802 searches the presentation data (FIG. 10) stored in the storage of presentation data 704, for the presentation content associated with the input recommended action ID and the presentation method ID. After completion of searching, the selection of presented content 802 outputs the presentation method ID and the presentation content associated therewith.

The reason of separating the presentation method data (FIG. 9) stored in the storage of presentation method 702 from the presentation data (FIG. 10) stored in the storage of presentation data 704 will hereinafter be described. The presentation data (FIG. 10) in the storage of presentation data 704 is fixed data (unchanged according to the degree of use by the user) that stores all the possible patterns of the presentation method IDs and the presentation contents for the respective recommended action IDs. On the other hand, the presentation method data (FIG. 9) in the storage of presentation method 702 indicates which presentation method is actually selected for the recommended action ID, and indicates which presentation method is selected for the user at the present point in time.

The two databases partially overlapping with each other are thus stored in the presentation device of recommended actions 110. Accordingly, measures can be taken that changes the presentation method according to the user even for the same recommended action, and changes the presentation method according to advancement of a degree of usage.

The switching by the presentation method 803 activates a presentation process in response to the selected presentation method ID. The switching by the presentation method 803 selects the process according to the mode of the presentation method which is through screen display, playing of speech, or direct control.

In a case of executing the displaying of presented content 804, the presentation content is displayed on the display screen of the hands-free communication device 111 or the car navigation device. In the case of FIG. 10, the icon is pointed as the presentation content data. Accordingly, the icon illustrating the recommended action (a picture of closing the window, a picture of reducing the volume of the car audio, etc.) is displayed on the display screen. Instead, the recommended action may be displayed in a sentence. In this case, the sentence is pointed as the presentation content.

In a case of a playing of presented content 805 is executed, the speech message is played from the loudspeaker 108. A method of separately storing the speech message data and a method of generating the speech message data as necessary can be considered as a method of storing the speech message data.

In the former case, the presentation content field of the data table shown in FIG. 10 should be stored with the speech message ID. In this case, the speech message (if the content of the speech message itself is stored in the presentation content field, the speech message matching with the contents of the characters) corresponding to the ID is retrieved from the speech message storage device and played as a speech.

In the latter case, the presentation content field of the data table shown in FIG. 10 is stored with the text to be read aloud itself. In this case, the text is supplied to the speech synthesis device, and converted into the speech. That is, the speech generated by conversion is played. The text to be read aloud may be fixed content. However, the text to be read aloud can newly be generated using a value of action data. For instance, in the case of FIG. 10, the presentation content whose presentation method ID is ID2 is stored with a text to be read aloud that is "REDUCE SPEED BY X KM/H". If the value of action data is inserted into the part of X in the text, the text to be actually read aloud can be generated at real time.

In a case of executing the pointing of presented content 806, the pointing action corresponding to the input presentation content (POINTING 1 etc.) is actually executed. In the case of this process, the pointing content storage device is separately searched for and the pointing action based on the search result is actually determined. FIG. 11 shows an example of the structure of the data table stored in the pointing content storage device. The data table shown in FIG. 11 is stored with data including sets of a pointing ID, an object ID for pointing and a pointing action ID. The pointing ID, which is identical to the pointing content stored in the presentation content field in FIG. 10, is stored.

In the case of FIG. 11, the pointing ID is used as a search key. That is, a matching search of the pointing ID is executed. As a result of the search, the object for pointing and the pointing action that correspond to the pointing ID are determined. The object for pointing is an object (device) as a target on which the pointing action is executed. The pointing action is executed on the target. The pointing ID shown in FIG. 11 is associated with an action of blinking a light disposed in proximity to the window at the right front, an action of causing the car stereo to play an alarm, an action of displaying characters of "RECOMMENDED SPEED X KM/H" on the speedometer and the like.

Individual pointing actions require respective special devices. However, in the pointing of presented content 806, these devices are appropriately selected, and appropriate processes are executed.

In a case of executing the directing of presented actions 807, an actual control action is executed on the basis of the input control ID (CONTROL 1 etc.). In the case of this process, the control content storage device is separately searched for, and the control action based on the search result is actually determined. FIG. 12 shows an example of the structure of the data table stored in the control content storage device. The data table shown in FIG. 12 is stored with data including sets of a control ID, an object ID for controls and control action ID. The control ID, which is identical to the control content stored in the presentation content field in FIG. 10, is stored.

In the case of FIG. 12, the control ID is used as a search key. That is, matching search of the control ID is executed. As a result of the search, the control object and the control action corresponding to the control ID are determined. The control object is an object (device) as a target to which the control action is applied. The realization method and the point that the apparatus (device) to be the control object is activated after the determination of the control are analogous to those in the aforementioned pointing of presented content 806. Accordingly, the description thereof is omitted.

[Conclusion]

By mounting the hands-free phone 111 (FIG. 1) according to this embodiment on the car, not only the basic hands-free communication but also specific presentation of a recommended action to improve the speech quality listened to by the opposite party can be performed. That is, the action recommended in order to restrain the cause of noise included in speech of the user can be presented to the user.

Accordingly, the user actually performs the presented specific action, thereby allowing the quality of the speech played on the distant side of communication to be effectively improved. Even in a case where with a certain recommended action does not effectively improve the quality of speech listened to by the opposite party, execution of other one or more recommended actions in a combined manner allows the quality of the speech listened to by the opposite party to be effectively improved.

Embodiment 2

This embodiment describes a hands-free system using a hands-free phone having a function of performing communication of speech quality with the distant side communication device.

[Overall Configuration]

Figure 13:
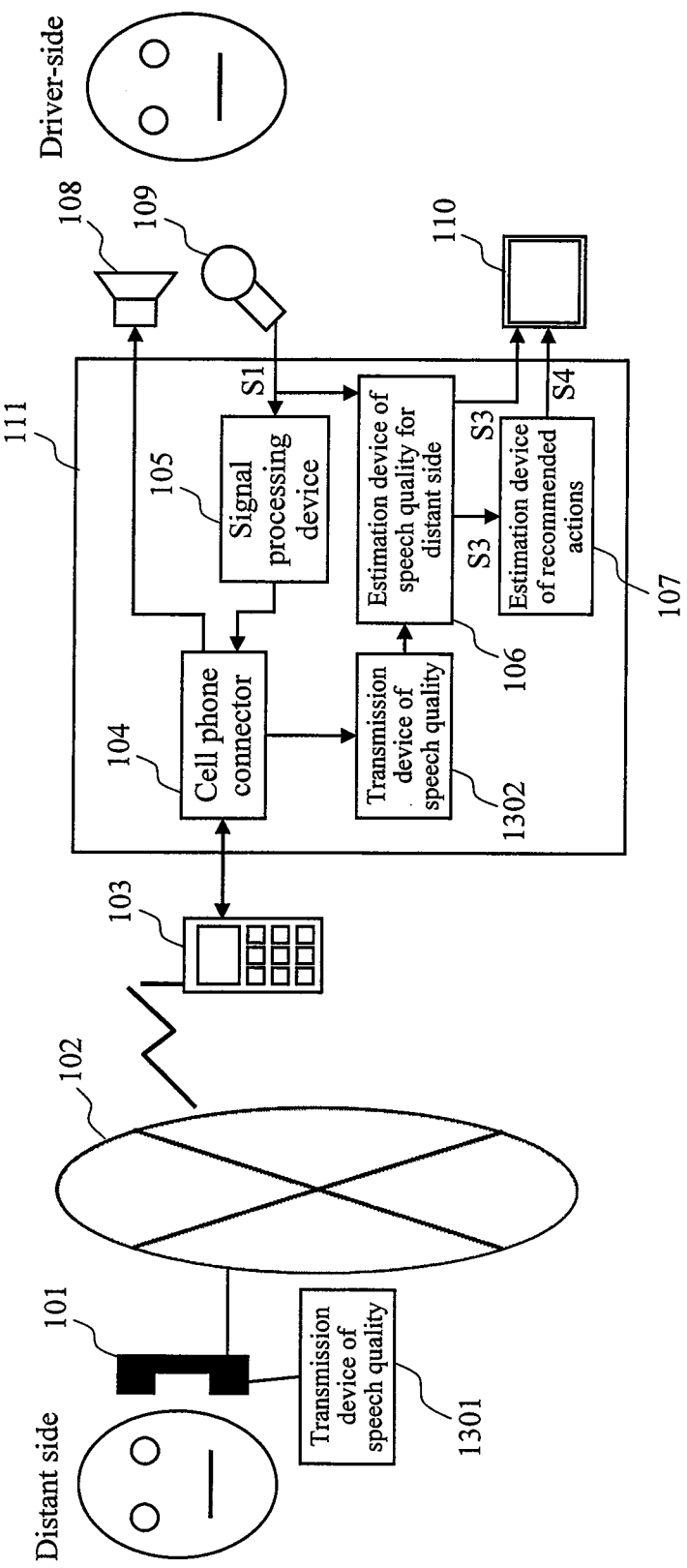
FIG. 13 is a diagram showing an overall configuration of a hands-free system according to Embodiment 2.

FIG. 13 shows an overall configuration of a hands-free system according to this embodiment. This system also assumes communication realized between the driver of the car and the opposite party, as with the case of Embodiment 1. Note that FIG. 13 shows components corresponding to those in FIG. 1 are assigned with the identical symbols.

As with the case of FIG. 1, the hands-free system shown in FIG. 13 includes the phone 101, the public telephone network 102, the cell phone 103, and the hands-free phone 111. Differences from FIG. 1 are a point that the phone 101 is connected with a transmission device of speech quality 1301, and a point that a transmission device of speech quality 1302 is added to the hands-free phone 111.

The estimation device of speech quality for the distant side 106 according to Embodiment 1 receives, as an input, one or two pieces of speech data that can be obtained in the hands-free communication device 111 (i.e., the original speech data S1 and the processed speech data S2), and applies acoustic analysis to the data to thereby estimate the quality of the speech listened to by the opposite party on the distant side.

However, also after the signal processing device 105, there are factors affecting playing quality of the speech, such as a speech compression process of the cell phone 103, packet loss in the public telephone network 102, and characteristics of the phone 101 disposed on the distant side (the type of speech decoding process, the acoustic characteristics of the loudspeaker, etc.). Accordingly, it can be considered that the quality of the speech actually listened to by the opposite party often further deteriorates.

In the case of Embodiment 1, the deterioration is preliminarily assumed, and the speech quality estimating process is executed. For instance, the speech quality is estimated, for instance, by adding a certain amount of degradation. As a more preferable embodiment, it is desirable to add a mechanism of exchanging actual speech quality information with the device of the user in communication on the distant side (e.g. phone 101).

Thus, in Embodiment 2, the transmission device of speech quality 1301 is arranged in the phone 101, and the transmission device of speech quality 1302 is embedded in the hands-free phone 111. The newly added transmission device of speech quality exchanges the speech quality information to thereby realize more correct estimation of the speech quality on the distant side. As a result, a more appropriate recommended action and a value of action can be determined.

The processing contents of the other components are analogous to those in Embodiment 1. Accordingly, the transmission devices of speech quality 1301 and 1302 that are specific to this embodiment will hereinafter be described.

[Configuration of Transmission Device of Speech Quality (Calling Side)]

Figure 15:
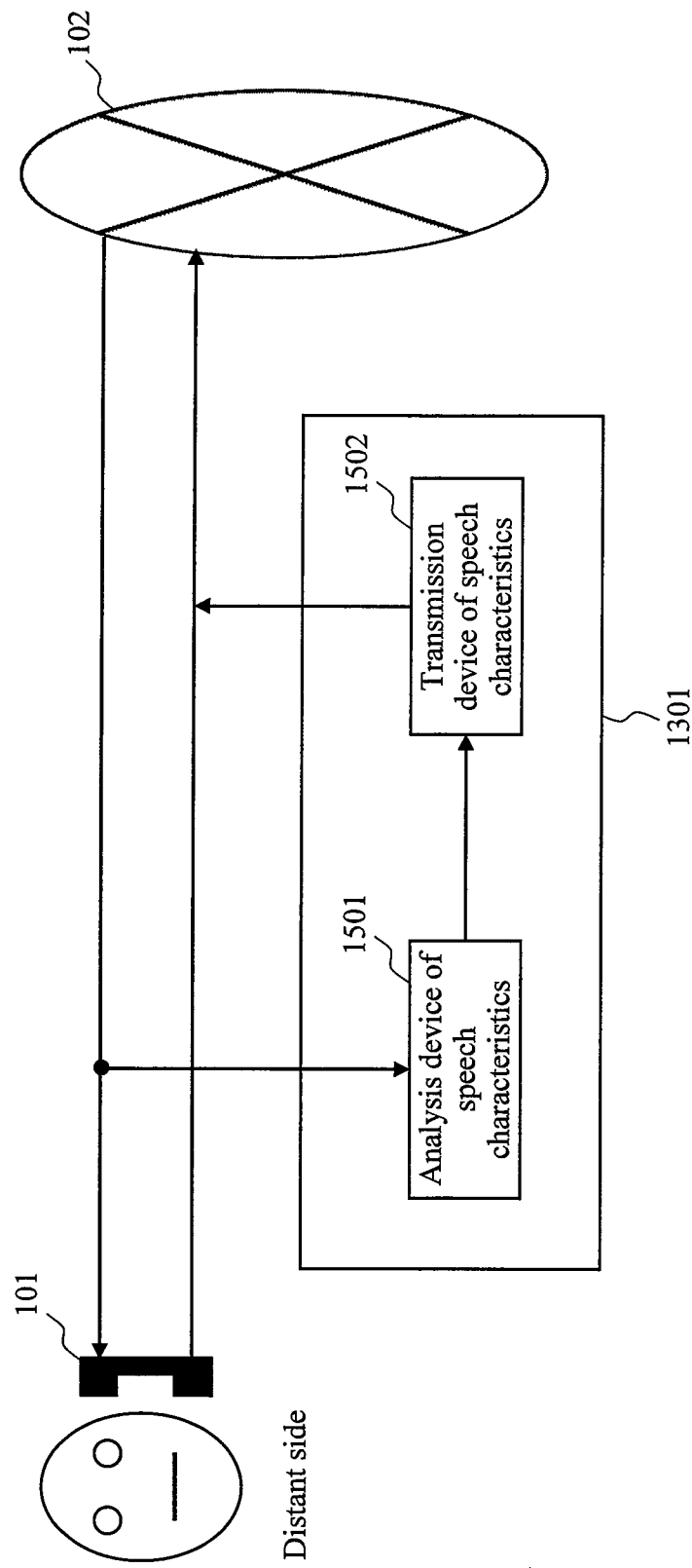
FIG. 15 is a diagram illustrating a configuration of a transmission device of speech quality (calling side) according to Embodiment 2.

FIG. 15 shows an example of the configuration of the transmission device of speech quality 1301 disposed on the communication distant side. In following description, the calling side indicates a side on which actual speech quality information as an estimation target in the distant side of communication is transmitted therefrom. The incoming side indicates a side on which the speech quality information is received from the transmission device of speech quality 1301 disposed on the distant side of communication, that is, the side of the hands-free phone 111.

The hands-free system (FIG. 13) of this embodiment assumes a system configuration that executes estimation of the quality of the speech played on the distant side and determination of the recommended action based on the estimation only on the driver-side (hereinafter, referred to as "near end"). Accordingly, in the case of this embodiment, configurations required for the transmission device of speech quality are different on the calling side and the incoming side.

In a case of determining the speech quality estimation and the recommended action on both the calling side and the incoming side, the transmission device of speech quality having the same structure may be disposed on each of the calling side and the incoming side.

A case where the structures of the transmission devices of speech quality are different on the calling side and the incoming side will hereinafter be described.

As described above, the transmission device of speech quality 1301 shown in FIG. 15 is a device disposed on the calling side. The transmission device of speech quality 1301 includes at least an analysis device of speech characteristics 1501 and a transmitter of speech characteristics 1502.

The analysis device of speech characteristics 1501 is a device identical to the analysis devices of speech characteristics 1401 and 1402 in the estimation device of speech quality for the distant side 106 shown in FIG. 14. The analysis device of speech characteristics 1501 is a device that analyzes and/or extracts speech characteristics information of the speech spoken by the user on the near end (i.e. the driver). That is, the analysis device of speech characteristics 1501 processes, as a processing target, the speech listened to by the opposite party (user) disposed on the distant side from the car.

The transmitter of speech characteristics 1502 transmits the speech characteristics information analyzed and/or extracted by the analysis device of speech characteristics 1501, to the opposite party (here, the hands-free phone 111 on the near end). That is, the speech characteristics information is transmitted as quality information of the playing speech.

In the case of FIG. 15, a configuration is adopted that superimposes the speech characteristics information on the communication speech (e.g. embedding the information as speech watermark information) and transmits superimposed speech. A configuration may be adopted that prepares a communication path separated from the communication speech line for transmission to the near end and transmits the speech characteristics information via the communication path.

In the case of using another communication path as with the latter, there is no need to embed the speech characteristics information in the speech data using the speech watermark technique. Accordingly, a typical data transmission technique can be used for transmitting the speech characteristics information.

This allows the speech characteristics information of the speech actually listened to by the user on the distant side to be transmitted to the near end (side of the hands-free phone 111).

[Configuration of Transmission Device of Speech Quality (Incoming Side)]

Figure 16:
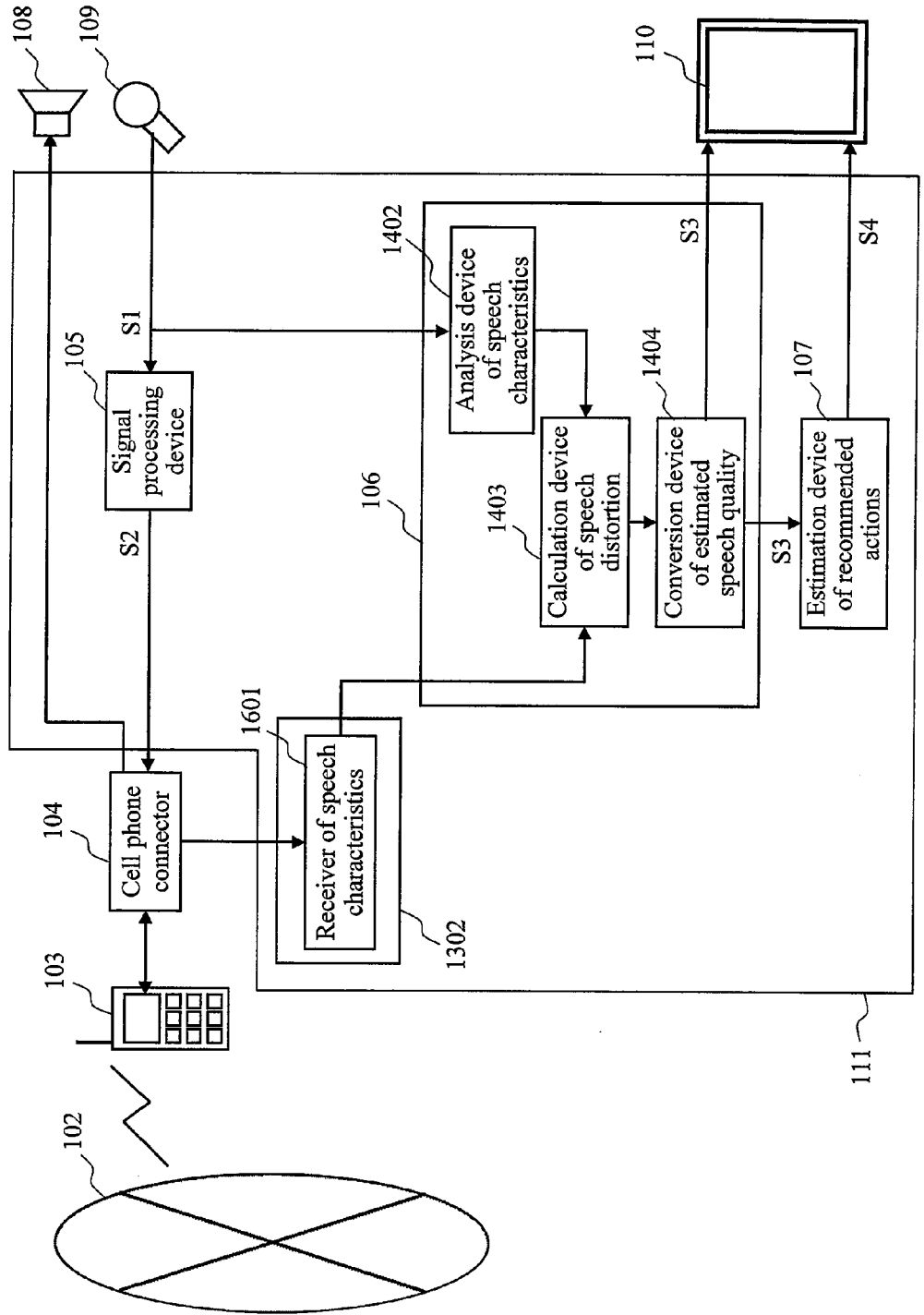
FIG. 16 is a diagram illustrating a configuration of a transmission device of speech quality (incoming side) according to Embodiment 2.

FIG. 16 shows a configuration of a device arranged on the driver-side (the incoming side on which the speech characteristics information is received). Note that FIG. 16 shows components corresponding to FIGS. 13 and 14 in a manner assigned with the identical symbols. The transmission device of speech quality 1302 on the incoming side is connected to the cell phone connector 104, and receives the speech characteristics information branched at the cell phone connector 104.

The transmission device of speech quality 1302 at least includes a receiver of speech characteristics 1601 that receives the speech characteristics information transmitted from the transmission device of speech quality 1301 on the calling side. The configuration of the receiver of speech characteristics 1601 is different according to a form of transmitting the speech characteristics by the transmitter of speech characteristics 1502. The receiver of speech characteristics 1601 executes either one of a process of extracting the speech characteristics information superimposed on the speech and a process of receiving the speech characteristics information transmitted on another line, according to the form of transmitting the speech characteristics.

The thus received speech characteristics information is input into the calculation device of speech distortion 1403 of the estimation device of speech quality for the distant side 106. The estimation device of speech quality for the distant side 106 (FIG. 16) in this embodiment calculates a speech distortion on the basis of the speech characteristics information received from the calling side, and the speech characteristics information extracted from the original speech data S1. This point is the difference from the estimation device of speech quality for the distant side 106 (FIG. 14) in Embodiment 1.

Subsequently, the calculated distortion is supplied to the conversion device of estimated speech quality 1404. The conversion device of estimated speech quality 1404 converts the obtained speech distortion into the estimated speech quality S3, and outputs the quality to the estimation device of recommended actions 107 and the presentation device of recommended actions 110.

[Conclusion]

By adopting a system configuration according to this embodiment, the speech actually listened to on the distant side can be compared with the original speech input onto the microphone 109. That is, the speech characteristics information of the speech listened to by the opposite party can be used. This allows speech quality estimation more accurate than Embodiment 1. As a result, this also allows estimation accuracy level of the recommended action to be improved.

Embodiment 3

This embodiment describes a hands-free phone having a function of determining whether or not the user (driver) actually performs the recommended action.

[Overall Configuration]

Figure 17:
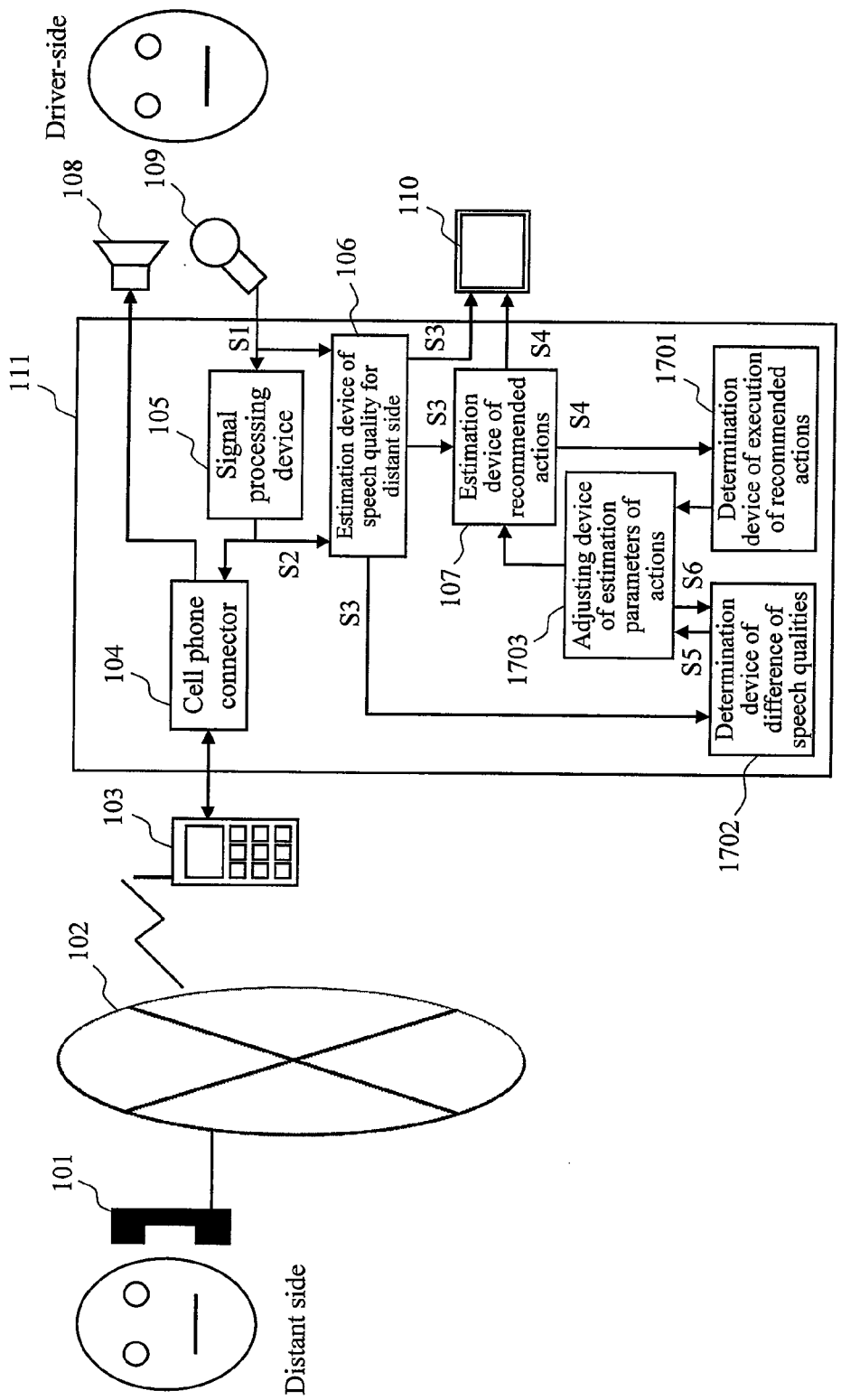
FIG. 17 is a diagram illustrating an overall configuration of a hands-free system according to Embodiment 3.

FIG. 17 shows an overall configuration of a hands-free system according to this embodiment. As with the case of Embodiment 1, this system also assumes communication realized between the driver of the car and the opposite party. Note that FIG. 13 shows components corresponding to those in FIG. 1 in a manner assigned with the identical symbols.

A differences from Embodiment 1 (FIG. 1) is a point that a determination device of execution of recommended actions 1701, a determination device of difference of speech qualities 1702 and an adjusting device of estimation parameters of actions 1703 are added to the hands-free phone 111 (FIG. 17) according to this embodiment.

Through use of these newly added devices, the hands-free phone 111 according to this embodiment realizes (1) determination of presence or absence of execution of the recommended action by the user, (2) in a case where the execution is confirmed, determination of change in quality of the communication speech causing a difference before and after the recommended action, and (3) change of a condition of presenting the recommended action. Mounting of this function enables more appropriate recommended action to be presented when the next recommended action is presented. That is, the hands-free phone 111 according to this embodiment provides a learning function of the recommended action presentation condition for the sake of presenting a more appropriate recommended action.

[Overview of Hands-Free Talking Process]

Here, an overview of a hands-free talking process executed through the hands-free phone 111 according to this embodiment (FIG. 17) will be described. Note that, since process operations from starting of the speech communication to presentation of the recommended action are identical to those in Embodiment 1, the description thereof is omitted.

At the same time when the recommended action estimated by the estimation device of recommended actions 107 is presented to the user (driver), the recommended action data S4 is also supplied to the determination device of execution of recommended actions 1701.

The determination device of execution of recommended actions 1701 determines whether or not the user (driver) has actually performed the recommended action estimated by the estimation device of recommended actions 107.

For instance, the recommended action data S4 points reduction by X km/h, the determination device of execution of recommended actions 1701 determines whether or not to perform the recommended action from speed information. For instance, in a case where the recommended action data S4 points closing of the driver-side window, the determination device of execution of recommended actions 1701 determines whether or not to perform the recommended action on the basis of an output of a sensor detecting open and close states of the driver-side window and information on rotation of the motor driving the window to open and close.

The determination result is output as recommended action execution information, from determination device of execution of recommended actions 1701 to the adjusting device of estimation parameters of actions 1703.

The determination device of difference of speech qualities 1702 periodically checks the estimated speech quality S3 at each point in time, and determines a difference of speech qualities before and after certain determination timing. The determination result is output as information on difference of speech qualities S5, to adjusting device of estimation parameters of actions 1703.

Lastly, the adjusting device of estimation parameters of actions 1703 uses recommended action execution information supplied from the determination device of execution of recommended actions 1701 and the information on difference of speech qualities S5 supplied from the determination device of difference of speech qualities 1702, and determines whether or not the recommended action is a correct estimated result to improve the speech quality.

Subsequently, the adjusting device of estimation parameters of actions 1703 adjusts the weight on the recommended action example data stored in the storage device of recommended action examples 403 in the estimation device of recommended actions 107, on the basis of the determined result. The adjustment of the weight restrains the recommended action having not contributed to improving the speech quality, and strengthens the recommended action having contributed thereto. As a result, in processes of estimating the recommended action at the next time and later, possibility that a more appropriate recommended action is estimated is improved.

[Configuration and Process in Each Device]

The configurations and contents of processes in the determination device of execution of recommended actions 1701, the determination device of difference of speech qualities 1702 and the adjusting device of estimation parameters of actions 1703 will hereinafter be described in detail.

[Details of Determination Device of Execution of Recommended Actions]

The recommended action data S4 is input from the estimation device of recommended actions 107 to the determination device of execution of recommended actions 1701. The recommended action data S4 at least includes action object information indicating the target of the recommended action, and action information indicating which action is performed on the target.

For instance, the window, car stereo, speedometer or the like can be considered for the action object information. More specifically, the object ID for pointing in FIG. 11 and the object ID for controls in FIG. 12 can be used as examples of the action object information. For instance, closing of the window (raising the automatic window), reducing of the volume (mute) and the like can be considered as the action information. More specifically, the control action ID in FIG. 12 can be used as an example of the action information.

Figures 18, 19:
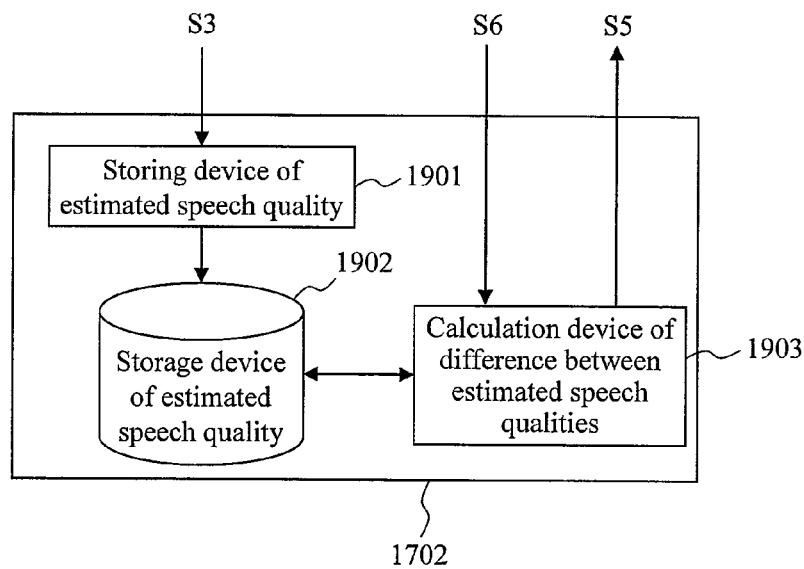
FIG. 18 is a diagram showing an embodiment of a recommended action information database.
FIG. 19 is a diagram showing an embodiment of a determination device of difference of speech qualities.

Note that, as the estimation device of recommended actions 107, an embodiment that refers to a recommended action information database having a data table structure shown in FIG. 18 is also considered. In the recommended action information database, the recommended action information, action object information, and action information are managed by respective IDs. The relationship of correspondence between pieces of information is defined through IDs.

In this case, the determination device of execution of recommended actions 1701 uses the action object information and the action information included in the recommended action data S4, and determines whether or not the action has actually been performed on the action object.

In this determination process, various processes are executed according to the device and/or action of the action object. Forms in which the processes are realized are various according to the devices and the actions.

For instance, as to the recommended action of closing and opening the window, it can be determined whether the window as the action object has been opened or closed, by checking the state of a device of opening and closing the window.

As to the recommended action of reducing the volume of the car stereo, it can be directly determined whether the volume is reduced or not, by checking information on the volume of the car stereo device. In another embodiment, indirect determination can also be made by checking whether or not the volume (power) of the speech played on the car stereo decreases on the basis of the speech in the car input from the speech input device (microphone) connected to the determination device of execution of recommended actions 1701.

The recommended action execution information output from the determination device of execution of recommended actions 1701 can be realized as information including the recommended action information and information on presence or absence of the execution thereof added thereto. It is necessary that information output from the estimation device of recommended actions 107 include information on time on which the recommended action is presented to the user (driver). The time information is also added to the recommended action execution information and output. Depending on the configuration of the adjusting device of estimation parameters of actions 1703, in certain cases, it is necessary that the ID information of the recommended action example data shown in FIG. 6 be received from the estimation device of recommended actions 107 and added to the recommended action information and output.

[Details of Determination Device of Difference of Speech Qualities]

The determination device of difference of speech qualities 1702 includes a storing device, not shown, that continuously accumulates the estimated speech quality S3 output from the estimation device of speech quality for the distant side 106 at regular intervals. The determination device of difference of speech qualities 1702 reads two estimated speech qualities S3 stored in a manner sandwiching a time designated by the adjusting device of estimation parameters of actions 1703, and outputs the difference between the two estimated speech qualities S3 as the information on difference of speech qualities S5.

FIG. 19 shows an example of the internal configuration of the determination device of difference of speech qualities 1702. The determination device of difference of speech qualities 1702 at least includes a storage device of estimated speech quality 1902 that accumulates the estimated speech quality S3, a storing device of estimated speech quality 1901 that stores the information, and the calculation of difference between estimated speech qualities 1903 that calculates the change of the estimated speech qualities stored before and after a designated point in time.

The storage device of estimated speech quality 1902 is, for instance, a hard disk device, a flash memory, or another data storage device. The storing device of estimated speech quality 1901 executes a process of storing data including estimated speech quality information output from the estimation device of the speech quality 106 and the time information added thereto in the storage device of estimated speech quality 1902.

When action execution time information S6 is supplied from the adjusting device of estimation parameters of actions 1703, the calculation of difference between estimated speech qualities 1903 supplies the difference between the two estimated speech qualities S3 accumulated before and after the point in time as the information on difference of speech qualities S5 in the adjusting device of estimation parameters of actions 1703.

Here, the calculation of difference between estimated speech qualities 1903 takes the estimated speech qualities S3 immediately before and after the point in time indicated by the action execution time information S6 from the estimated speech quality storage device 1902, and calculates the difference thereof. Here, those immediately before and after the time include those before and after that in consideration of time interval individually defined by the action object of the recommended action and action.

The information on difference of speech qualities S5 may be defined as a simple difference of the estimated speech qualities S3. In a case where the estimated speech quality S3 is implemented as a certain type of vector information, the distance or the like between the vectors may be the definition of the information on difference of speech qualities S5.

[Details of Adjusting Device of Estimation Parameters of Actions]

The adjusting device of estimation parameters of actions 1703 executes a process of adjusting the parameter defining the recommended action condition every time when the recommended action execution information is output from the determination device of execution of recommended actions 1701.

Figure 20:
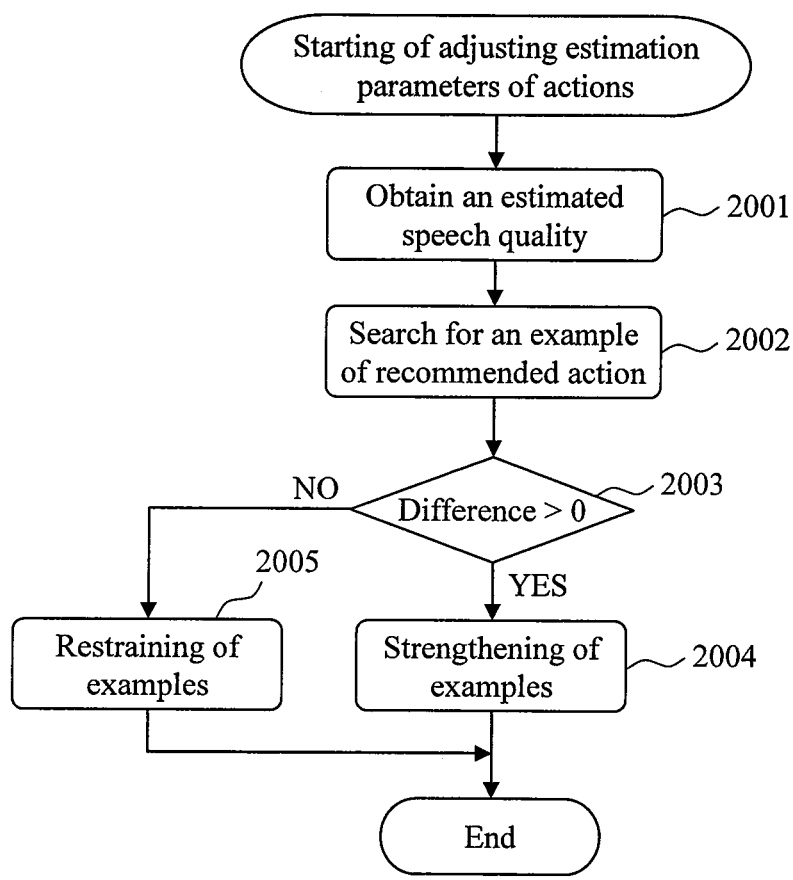
FIG. 20 is a flowchart illustrating the content of adjusting process of estimation of actions according to the embodiment.

FIG. 20 illustrates the flow of the process executed in the adjusting device of estimation parameters of actions 1703.

When the recommended action execution information is input from the determination device of execution of recommended actions 1701, the adjusting device of estimation parameters of actions 1703 starts the process of adjusting the estimation parameters of actions. First, the adjusting device of estimation parameters of actions 1703 supplies the action execution time information S6 recorded in the recommended action execution information to the determination device of difference of speech qualities 1702.

Subsequently, in the process 2001, the adjusting device of estimation parameters of actions 1703 obtains the information on difference of speech qualities S5 generated before and after the point in time designated by the action execution time information S6.

Next, a process 2002 is executed. In the process, the adjusting device of estimation parameters of actions 1703 searches the storage device of recommended action examples 403 for information corresponding to the recommended action recorded in the recommended action execution information.

For the sake of the search, the adjusting device of estimation parameters of actions 1703 and the estimation device of recommended actions 107 are required to share the identical storage device of recommended action examples 403. The order of the process 2001 and the process 2002 may be replaced with each other.

Next, in a process 2003, the adjusting device of estimation parameters of actions 1703 determines the positive or negative sign of the information on difference of speech qualities S5.

Here, the positive sign of the difference (i.e. increase in the estimated speech quality S3 from the value before the recommended action to that thereafter) means that the recommended action estimated by the estimation device of recommended actions 106 has contributed. In this case, the adjusting device of estimation parameters of actions 1703 proceeds to a process 2004, and increases the weight on the corresponding recommended action example data. That is, the adjusting device of estimation parameters of actions 1703 executes a process of strengthening the degree of recommendation.

On the other hand, the negative sign of the difference (i.e., decrease in the estimated speech quality S3 from the value before execution of the recommended action to that thereafter) means that the recommended action estimated by the estimation device of recommended actions 106 has impaired improvement in speech quality. In this case, the adjusting device of estimation parameters of actions 1703 proceeds to a process 2005, and reduces the weight on the corresponding recommended action example data. That is, the adjusting device of estimation parameters of actions 1703 executes a process of restraining the degree of recommendation.

The processing contents actually executed in the processes of strengthening and restraining the degree of recommendation differ according to the structure of the recommended action example data and the configuration of the estimation device of recommended actions 107. However, in general, the estimation of recommended actions can be regarded as a learning problem based on many examples. Accordingly, a machine learning algorithm assuming supervising data can be used for the strengthening and restraining processes here.

An embodiment of the processes of strengthening and restraining a recommended action based on the recommended action example data exemplified in FIG. 6 will hereinafter be described. It is provided that the recommended action execution information supplied from the determination device of execution of recommended actions 1701 includes ID information of the recommended action example data. In this case, the processes of strengthening and restraining the recommended action can be realized using a following method.

First, the adjusting device of estimation parameters of actions 1703 searches the storage device of recommended action examples 403 for the recommended action example data corresponding to the input ID information.

Here, in the case of strengthening the degree of recommendation of a certain action, the adjusting device of estimation parameters of actions 1703 adds a certain amount to the value of the action configuring the retrieved recommended action example data to thereby increase the corresponding value of action.

On the other hand, in the case of restraining the degree of recommendation of a certain action, the adjusting device of estimation parameters of actions 1703 subtracts a certain amount from the information on the value of action configuring the retrieved recommended action example data to thereby reduce the corresponding value of action.

If the process changes the sign of the information of the value of action from the positive sign to the negative sign, the adjusting device of estimation parameters of actions 1703 changes the content of the recommended action ID recorded in the recommended action example data so as to be an inverted action.

For instance, as to the recommended action "SPEAK LOUDER", if the sign of the information on the value of action changes from the positive sing to the negative sign, the adjusting device of estimation parameters of actions 1703 changes the action ID to "SPEAK LOWER".

For instance, in the case of the recommended action without designation of the value of action, in order to strengthen the degree of recommendation, the adjusting device of estimation parameters of actions 1703 does not change the content of the recommended action at all. On the other hand, in the case of the recommended action without designation of the value of action, in order to restrain the degree of recommendation, the adjusting device of estimation parameters of actions 1703 changes the action ID such that the content of the recommended action becomes an inverted action.

Note that still another embodiment can be considered as the processing method of strengthening and restraining the degree of recommendation of the recommended action. The k-nearest neighbor method can be used for the algorithm of the estimation of recommended actions.

This method searches the k examples close to the input characteristics vector, and outputs the recommended action most recorded in the data as the recommended action. In the case of using this algorithm, a method of increasing the number of examples can be used for strengthening and restraining the degree of recommendation.

In the case of strengthening the degree of recommendation, it is suffice that the adjusting device of estimation parameters of actions 1703 combines the characteristics vector calculated at this time with the recommended action ID and the value of action in the example selected at this time to create a new example and additionally stores the created example in the storage device of recommended action examples. On the other hand, in the case of restraining the degree of recommendation, it is suffice that the adjusting device of estimation parameters of actions 1703 additionally adds an action ID indicating the content that is reversed to that of the recommended action ID, to the characteristic vector calculated at this time.

[Conclusion]

By mounting of the hands-free phone 111 according to this embodiment (FIG. 17) on the car, effects of improving the speech quality due to execution of the recommended action can be learned and reflected in estimation of the recommended actions at the next time and thereafter.

That is, the recommended action can be strengthened or restrained according to the algorithm of the estimation of recommended actions.

The learning process in this embodiment is executed in a unit of the hands-free phone 111 (FIG. 17). However, the user (driver) may be registered to thereby allow the learning process to be executed for each user. In the case where the hands-free phone 111 (FIG. 17) is detachable from the car, the mounted car may be registered to thereby allow the learning process to be executed for each car.

In this embodiment, the learning of the recommended action is executed in a unit of the hands-free phone 111 (FIG. 17). However, statistically processed learning result data may be received from a car manufacturer, a dealer or a third-party organization, via the cell phone 103 or the like. Together with this function, a function may be mounted that is capable of uploading learning result data specific to the hands-free phone 111 (FIG. 17) to a server managed and operated by the car manufacturer or the like.

Other Embodiments

The aforementioned embodiments mainly assume the hands-free phone mounted on the car. However, even with a hands-free phone used in circumstances where an independent action by a user can increase or decrease the noise superimposed into the microphone, this phone is not limited to the type mounted on the car. The hands-free phone may be mounted as a function module in a cell phone, or may be capable of being detachably attached to a cell phone.

In the aforementioned embodiments, the case is assumed that the hands-free phone is mounted on the car. However, the car on which the hands-free phone is mounted is not limited to a car.

In the aforementioned embodiments, one recommended action is associated with one presentation method. However, the aforementioned presentation methods may be associated therewith. Together with presentation of the recommended action by the speech, the object device of the recommended action may simultaneously be designated by a lamp or the like. That is, a plurality of recommended actions may simultaneously be presented.

The present invention is not limited to the aforementioned exemplary embodiments. Instead, various modifications are included. For instance, in the aforementioned exemplary embodiments, detailed description has been made to facilitate understanding, which does not necessarily limit the invention to those including the entire described components. A part of a certain embodiment can be replaced with the configuration of another exemplary embodiment. The configuration of a certain exemplary embodiment can be modified by adding the configuration of another exemplary embodiment. A part of the configuration of each exemplary embodiment can be subjected to addition of another configuration, deletion or replacement.

A part of or the entire parts of each of the aforementioned configurations, functions, processors, processing means and the like may be realized as, for instance, an integrated circuit or another hardware. Each of the configurations, functions and the like may be realized by a processor analyzing and executing programs realizing respective functions. That is, these may be realized as software. Information of the programs, tables, files and the like that realize the functions can be stored in storing device, such as a memory, hard disk or SSD (Solid State Drive), or a storing medium, such as an IC card, SD card or DVD.

Only control lines and information lines are shown that can be considered to be required for illustration. Not all the control lines and information lines required for a product are shown. In actuality, it can be considered that almost all the configurational components are connected to each other.

DESCRIPTION OF SYMBOLS

101 . . . phone, 102 . . . public telephone network, 103 . . . cell phone, 104 . . . cell phone connector, 105 . . . signal processing device, 106 . . . estimation device of speech quality for the distant side, 107 . . . estimation device of recommended actions, 108 . . . loudspeaker, 109 . . . microphone, 110 . . . presentation device of recommended actions, 111 . . . hands-free phone, 401 . . . extraction device of characteristics, 402 . . . search device of recommend action data, 403 . . . storage device of recommended action examples, 701 . . . search device of presentation method, 702 . . . storage of presentation method, 703 . . . selection device of the content of the presentation of recommended actions, 704 . . . storage of presentation data, 705 . . . display of content of the presentation, 706 . . . playing device of content of the presentation, 707 . . . pointing device of content of the presentation, 708 . . . directing device of presented actions, 1301, 1302 . . . transmission device of speech quality, 1401, 1402 . . . analysis device of speech characteristics, 1403 . . . calculation device of speech distortion, 1404 . . . conversion device of estimated speech quality, 1501 . . . analysis device of speech characteristics, 1502 . . . transmitter of speech characteristics, 1601 . . . receiver of speech characteristics, 1701 . . . determination device of execution of recommended actions, 1702 . . . determination device of difference of speech qualities, 1703 . . . adjusting device of estimation parameters of actions, 1901 . . . storing device of estimated speech quality, 1902 . . . storage device of estimated speech quality, 1703 . . . calculation of difference between estimated speech qualities.

What is claimed is:

1. A hands-free terminal transmitting and receiving speech data to and from at least one distant device via a communication device, comprising:
  a distant speech quality estimation unit that estimates a quality of playing speech of the at least one distant device;
  a recommended action estimation unit that estimates an action to be implemented by a user of the hands-free terminal in order to improve a quality of the playing speech;
  a recommended action presentation unit that presents the user with the estimated recommended action;
  a recommended action execution determination unit that determines the presence or absence of execution of the recommended action by the user;
  a unit for determining a difference of speech qualities that obtains a difference in qualities of the playing speech before and after execution of the recommended action; and
  an estimated parameter adjustment unit that adjusts a parameter of the recommended action estimation unit on the basis of the difference.

2. The hands-free terminal according to claim 1, further comprising:
   a display unit displaying a character and an image,
   wherein the recommended action presentation unit includes a presentation content display controller that causes the display unit to display an icon showing the estimated recommended action or a text.

3. The hands-free terminal according to claim 1, further comprising:
   a speech player for playing speech,
   wherein the recommended action presentation unit includes a presentation content player that causes the speech player to play speech data describing the estimated recommended action.

4. The hands-free terminal according to claim 1, further comprising:
   an object pointing unit that points an apparatus to be a control object of the recommended action or an apparatus related to the recommended action, or places thereof,
   wherein the recommended action presentation unit includes a presentation content pointing unit that presents a recommended action requested from the user via the apparatus to be the estimated control object of the recommended action or related to the recommended action or the object pointing unit disposed at the places thereof.

5. The hands-free terminal according to claim 1, further comprising:
   an apparatus controller that directly controls the apparatus to be the control object of the recommended action,
   wherein the recommended action presentation unit includes a control pointing unit that points the apparatus controller to execute a prescribed control on the apparatus to be the estimated control object of the recommended action.

6. The hands-free terminal according to claim 1, further comprising:
   a plurality of the recommended action presentation units whose presentation actions corresponding thereto are different from each other; and
   a presentation method selection unit that determines execution of presentation of the recommended action by means of at least any one of the plurality of recommended action presentation units.

7. The hands-free terminal according to claim 1, further comprising:
   a speech quality presentation unit that presents the user with information for estimating the quality of the playing speech.

8. The hands-free terminal according to claim 1,
   wherein the distant speech quality estimation unit estimates the quality of the playing speech of the distant device on the basis of speech data of the user input into the hands-free terminal, and speech data whose noise component is restrained by signal processing on the speech data.

9. The hands-free terminal according to claim 1,
   wherein the distant speech quality estimation unit estimates a quality of a playing speech at the distant device on the basis of the speech data whose noise component is restrained by the signal processing on the speech data of the user input into the hands-free terminal.

10. The hands-free terminal according to claim 1,
    wherein the distant speech quality estimation unit includes a transmitter of speech quality that performs communication of a quality of the playing speech with the distant side device, and outputs the quality information received from the distant side device by the transmitter of speech quality, as an estimated result.

11. A hands-free system for cars comprising the hands-free terminal according to claim 1.

12. The hands-free system for cars according to claim 11,
    wherein the recommended action is a control on a car-mounted apparatus or an apparatus used in a state mounted on a car.

13. The hands-free system for cars according to claim 11,
    wherein the recommended action is a control related to driving of a car.

* * * * *